(12) United States Patent
Hitomi et al.

(10) Patent No.: US 8,468,823 B2
(45) Date of Patent: Jun. 25, 2013

(54) SUPERCHARGED DIRECT-INJECTION ENGINE

(75) Inventors: Mitsuo Hitomi, Hiroshima (JP);
Masahisa Yamakawa, Hiroshima (JP);
Takashi Youso, Hiroshima (JP);
Toshiaki Nishimoto, Hiroshima (JP);
Keiji Araki, Hiroshima (JP)

(73) Assignee: Mazda Motor Corporation (JP)

( * ) Notice: Subject to any disclaimer, the term of this patent is extended or adjusted under 35 U.S.C. 154(b) by 547 days.

(21) Appl. No.: 12/728,830

(22) Filed: Mar. 22, 2010

(65) Prior Publication Data

US 2011/0067679 A1    Mar. 24, 2011

(30) Foreign Application Priority Data

Mar. 31, 2009    (JP) .................... 2009-085670

(51) Int. Cl.
*F02B 33/44*    (2006.01)
*F02B 33/00*    (2006.01)
*F02D 23/00*    (2006.01)
*B60T 7/12*    (2006.01)
*G05D 1/00*    (2006.01)
*G06F 7/00*    (2006.01)
*G06F 17/00*    (2006.01)

(52) U.S. Cl.
USPC .............. 60/611; 60/598; 60/601; 60/605.1; 123/564; 701/104

(58) Field of Classification Search
USPC .............. 60/598, 601, 605.1, 611; 123/295, 123/305, 431, 564; 701/103, 104, 113
See application file for complete search history.

(56) References Cited

U.S. PATENT DOCUMENTS 4,391,184 A * 7/1983 Yamane et al. ............... 92/100
6,327,856 B1 * 12/2001 Iwabuchi et al. ............. 60/603

(Continued)

FOREIGN PATENT DOCUMENTS

EP    1 031 722 A2    8/2000
EP    1 134 378 A2    9/2001

(Continued)

OTHER PUBLICATIONS

Japanese Office Action "Notice of Reasons for Rejection" with mailing date of Feb. 15, 2011; Japanese Patent Application No. 2009-085670; with translation.

(Continued)

*Primary Examiner* — Kenneth Bomberg
*Assistant Examiner* — Audrey K Bradley
(74) *Attorney, Agent, or Firm* — Studebaker & Brackett PC

(57) ABSTRACT

Disclosed is a supercharged direct-injection engine, which comprises a supercharging device (25, 30) for compressing intake air, and an injector 10 for directly injecting fuel into a combustion chamber 5. In the engine, an excess air factor λ as a ratio of an actual air-fuel ratio to a stoichiometric air-fuel ratio, at least in an engine warmed-up mode, is set to 2 or more in the entire engine-load region. Further, compressed self-ignited combustion is performed in a low engine-load region, and a supercharging amount by the supercharging device (25, 30) is increased along with an increase in engine load in a high engine-load region to allow the excess air factor λ to be kept at 2 or more. The engine of the present invention can effectively reduce NOx emission, while improving fuel economy.

3 Claims, 11 Drawing Sheets

U.S. PATENT DOCUMENTS

| | | | |
|---|---|---|---|
| 2004/0134462 A1* | 7/2004 | Strom et al. | 123/294 |
| 2005/0288846 A1* | 12/2005 | Liu et al. | 701/104 |
| 2006/0162692 A1 | 7/2006 | Irisawa | |

FOREIGN PATENT DOCUMENTS

| | | |
|---|---|---|
| EP | 1 435 445 A1 | 7/2004 |
| EP | 1643110 A1 | 4/2006 |
| JP | H5-118253 A | 5/1993 |
| JP | 2001-207889 A | 8/2001 |
| JP | 2003-343312 A | 12/2003 |
| JP | 2005-030255 A | 2/2005 |
| JP | 2005-325818 A | 11/2005 |
| JP | 2005325818 A * | 11/2005 |

OTHER PUBLICATIONS

Alois Amstutz et al.; "EGO Sensor Based Robust Output Control of EGR in Diesel Engines"; IEEE Transactions on Control Systems Technology; Mar. 1995, No. 1, New York, US; pp. 39-48, XP508609.

The Extended European Search Report dated Jun. 11, 2010; Application No. 10003214.3-2311.

* cited by examiner

SUPERCHARGED DIRECT-INJECTION ENGINE

BACKGROUND OF THE INVENTION

1. Field of the Invention

The present invention relates to a supercharged direct-injection engine which comprises a supercharging device for compressing intake air, and an injector for directly injecting fuel into a combustion chamber.

2. Description of the Background Art

Heretofore, there has been known a spark-ignition gasoline engine designed to be operated with a predetermined lean fixed air-fuel ratio (e.g., about 25), in an engine operating region where an intake air amount is equal to or less than a given value, and operated with a combustible lean air-fuel ratio greater than the fixed air-fuel ratio, in an engine operating region where the intake air amount is greater than the given value, as disclosed, for example, in JP 2005-30255A.

Specifically, the gasoline engine disclosed in the above patent document is designed to compress intake air using a turbocharger, at least in an engine operating region where the engine is operated with the combustible lean air-fuel ratio, to increase the air-fuel ratio to become greater (leaner) than the fixed air-fuel ratio. This provides an advantage that a lean air-fuel ratio is achieved in a wide engine operating region to allow fuel consumption or NOx emission to be reduced.

While the above patent document makes no mention of how to ensure combustion performance in a wide engine operating region under lean air-fuel ratios, it is often that a technique of directly injecting fuel from an injector into a combustion chamber to perform stratified combustion is employed to achieve lean combustion (lean burn) in a spark-ignition gasoline engine. Specifically, the technique is intended to directly inject high-pressure fuel from an injector into a combustion chamber in such a manner that the injected fuel is unevenly distributed around a spark plug and formed as a layer having a combustible air-fuel ratio to ensure combustion performance, while achieving a lean air-fuel ratio for the entire combustion chamber.

However, in combustion of an air-fuel mixture under a condition that a fuel rich atmosphere is locally formed around a spark plug in the above manner (stratified combustion), a combustion temperature becomes higher to promote NOx generation, which causes a problem of being unable to obtain a sufficient NOx-reduction effect.

SUMMARY OF THE INVENTION

In view of the above circumstances, it is an object of the present invention to provide a supercharged direct-injection engine capable of more effectively reducing NOx emission while improving fuel economy.

In order to achieve the above object, according to one aspect of the present invention, there is provided a supercharged direct-injection engine which comprises a supercharging device for compressing intake air, and an injector for directly injecting fuel into a combustion chamber. In the supercharged direct-injection engine, an excess air factor $\lambda$ as a ratio of an actual air-fuel ratio to a stoichiometric air-fuel ratio, at least in an engine warmed-up mode, is set to 2 or more in an entire engine-load region. Further, compressed self-ignited combustion is performed in a low engine-load region, and a supercharging amount by the supercharging device is increased along with an increase in engine load in a high engine-load region to allow the excess air factor $\lambda$ to be kept at 2 or more.

BRIEF DESCRIPTION OF DRAWINGS

FIGS. 8A and 8B are graphs for explaining a change in combustion pressure which occurs in a block injection mode where fuel is injected once in block, wherein FIG. 8A shows the fuel injection timing and a fuel injection amount, and FIG. 8B shows the combustion pressure.

FIGS. 9A and 9B are graphs for explaining a change in combustion pressure which occurs in a split injection mode where fuel is injected in two stages, wherein FIG. 9A shows the fuel injection timings and each fuel injection amount, and FIG. 9B shows the combustion pressure.

FIGS. 10A and 10B are graphs for explaining a change in combustion pressure which occurs in a split injection mode where fuel is injected in three stages, wherein FIG. 10A shows the fuel injection timings and each fuel injection amount, and FIG. 10B shows the combustion pressure.

DESCRIPTION OF THE PREFERRED EMBODIMENTS

Figure 1:
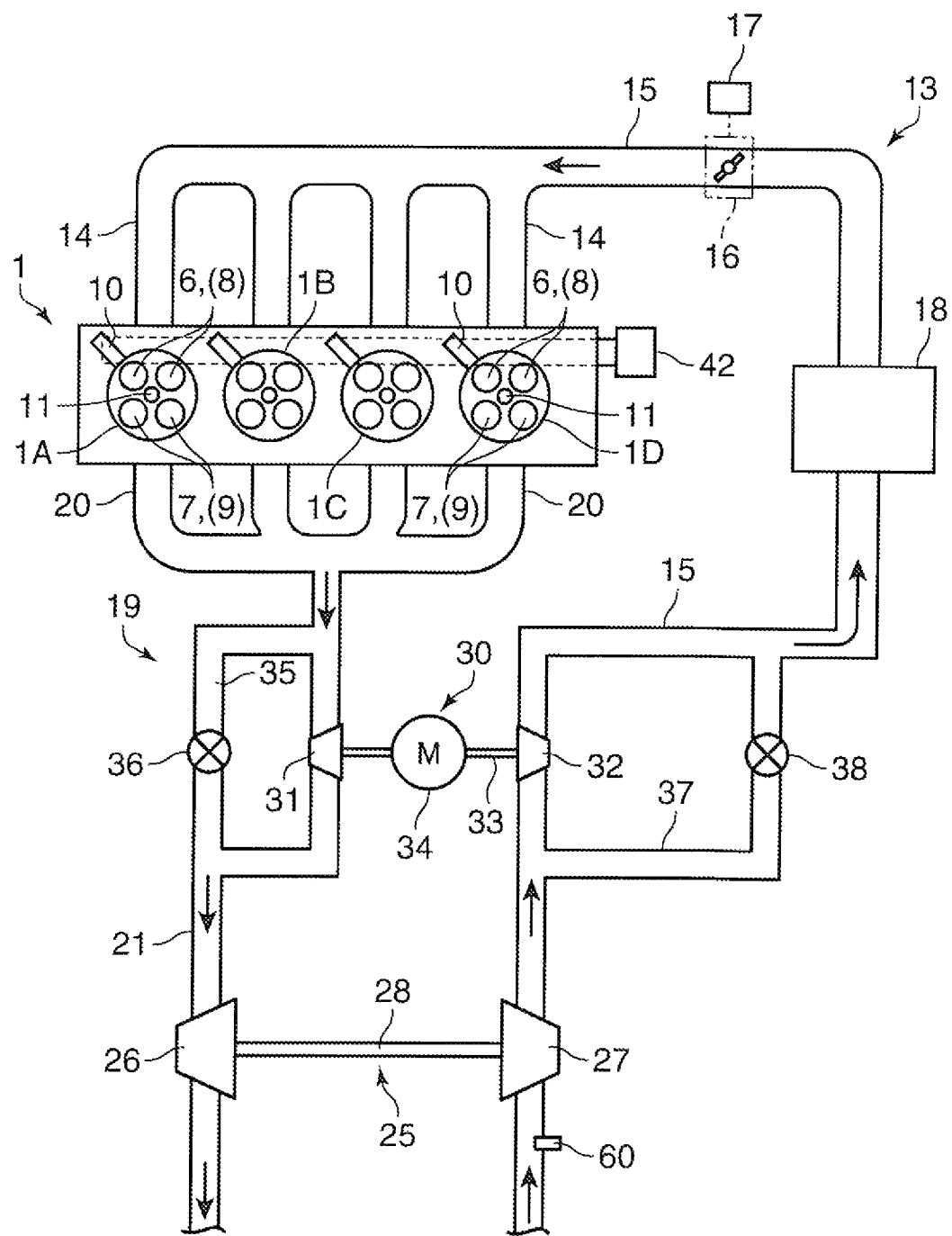
FIG. 1 is a schematic diagram showing an overall structure of a supercharged direct-injection engine according to one embodiment of the present invention.
Figure 2:
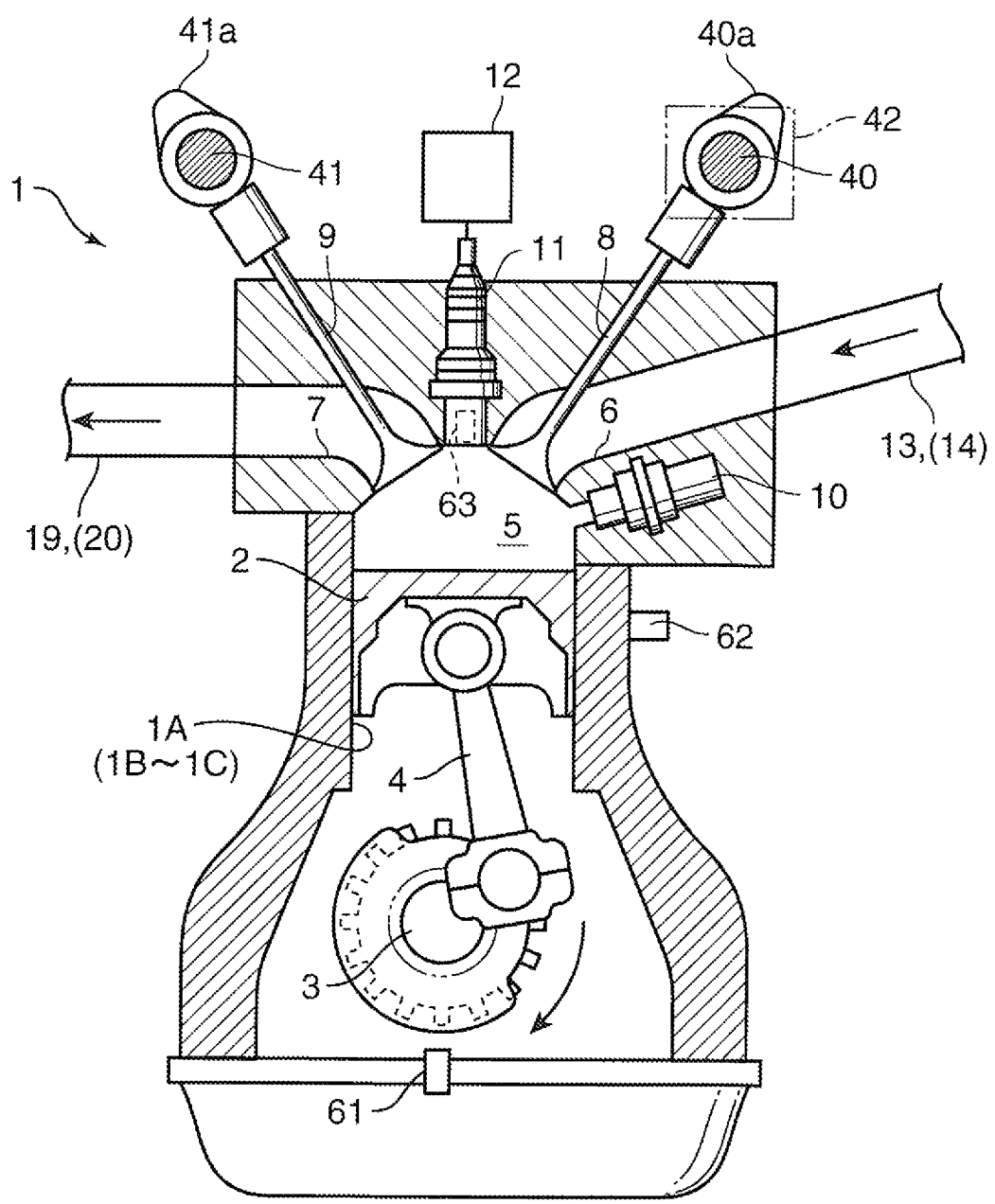
FIG. 2 is a sectional view showing an engine body of the engine in FIG. 1.

FIG. 1 is a schematic diagram showing an overall structure of a supercharged direct-injection engine according to one embodiment of the present invention. FIG. 2 is a sectional view showing a specific structure of an engine body 1 of the engine. The engine illustrated in FIGS. 1 and 2 is a multicylinder gasoline engine, wherein a plurality of cylinders (in the illustrated embodiment, four cylinders 1A to 1D) are provided in the engine body 1, and a piston 2 (FIG. 2) is fittingly inserted in each of the cylinders 1A to 1D. The piston 2 is connected to a crankshaft 3 through a connecting rod 4 to allow the crankshaft 3 to be rotated about an axis thereof according to reciprocating movement of the piston 2.

A combustion chamber 5 is defined above the piston 2, and an upper portion of the engine body 1 is provided with an intake port 6 and an exhaust port 7 each opened to the combustion chamber 5, and an intake valve 8 and an exhaust valve 9 adapted to open and close corresponding ones of the intake and exhaust ports 6, 7. The illustrated engine is a so-called double overhead camshaft (DOHC) engine, wherein each of the intake valve 8 and the exhaust valve 9 is provided in a number of two for each of the cylinders, and two camshafts 40, 41 (FIG. 2) each adapted to be rotated in conjunction with the crankshaft 3 are provided on an upper side of respective groups of the intake valves 8 and the exhaust valves 9 in such a manner that the intake and exhaust valves 8, 9 are openably/closably driven individually by two groups of cams 40a, 41a attached to respective ones of the camshafts 40, 41.

The engine body 1 is provided with a variable valve timing (VVT) mechanism 42 adapted to variably change a closing timing of the intake valve 8.

The VVT mechanism 42 may be comprised of a variable cam phase mechanism adapted to change a rotational phase of the intake camshaft 40 with respect to the crankshaft 3 depending on an engine operating state. There have heretofore been known various structures as to the variable cam phase mechanism. Thus, although a detailed description of a structure of the VVT mechanism 42 will be omitted, the VVT mechanism 42 may have one of the conventional structures, for example, a structure where a rotation of a crankshaft is transmitted to a camshaft and a cam pulley through a timing belt, while interposing a phase-changing member between the camshaft and the cam pulley in such a manner as to allow the camshaft and the cam pulley to be rotated relative to each other, wherein the phase-changing member is driven hydraulically or electrically.

Alternatively, the VVT mechanism may be comprised of a variable valve lift mechanism adapted to change a valve lift amount to variably change a closing timing of the intake valve 8. Further, the variable valve lift mechanism may be used in combination with the variable cam phase mechanism to allow change control of an effective compression ratio and control of an overlap amount between the intake and exhaust valves 8, 9 to be simultaneously performed.

Further, the engine body 1 is provided with an engine speed sensor 61 for detecting a rotation speed of the crankshaft 3, a coolant temperature sensor 62 for detecting a temperature of engine coolant, and an in-cylinder pressure sensor 63 for detecting a pressure of the combustion chamber 5, as shown in FIG. 2.

The engine body 1 has an injector 10 for directly injecting fuel into the combustion chamber 5, and a spark plug 11 for discharging an igniting spark in the combustion chamber 5, each of which is provided in a number of one for each of the cylinders, as shown in FIGS. 1 and 2. In the illustrated embodiment, the injector 10 is provided to face the combustion chamber 5 from a lateral end of an intake-side region thereof, and the spark plug 11 is provided to face the combustion chamber 5 from a top thereof.

The spark plug 11 is electrically connected to an ignition circuit device 12 for generating electric power for spark discharge, so that a spark is discharged from the spark plug 11 at a given timing, in response to an electric power supply from the ignition circuit device 12. In this embodiment, the ignition circuit device 12 is adapted to be capable of causing the spark plug 11 to successively generate spark discharge plural times, i.e., to perform a so-called "multi-spark ignition".

The injector 10 is adapted to be capable of injecting fuel (gasoline) at a pressure fairly greater than a fuel injection pressure of an injector for use in a conventional gasoline engine. Specifically, an injection pressure of an injector for use in a conventional direct-injection gasoline engine is about 20 MPa, whereas the injector 10 in this embodiment is adapted to be capable of injecting fuel at a high injection pressure of 100 MPa or more.

In order to inject fuel under a highly-pressurized state in the above manner, it is contemplated to employ, as an injection system for the injector 10, a common rail system (system designed to highly pressurize fuel forcedly fed from a fuel supply pump, by means of a pressure-accumulating common rail, and then supply the highly-pressurized fuel to an injector) recently used in diesel engines. It is understood that any suitable system other than the common rail system may be employed, as long as it is capable of providing a high injection pressure of 100 MPa or more.

The injector 10 is formed as a multi-hole type where a plurality of injection holes are provided in a nozzle portion at a distal end thereof. The multi-hole injector is intended to inject the highly-pressurized fuel from the plurality of injection holes in a distributed manner to facilitate atomization of the fuel in the combustion chamber 5.

Further, with a view to allowing the injector 10 to accurately inject fuel therefrom at a required timing, the injector 10 in this embodiment is formed as a type using a piezoelectric element (piezoelectric type) which has already been put to practical use in the field of common-rail diesel engines. Specifically, considering that, in the engine according to this embodiment, there is a need for an accurate fuel injection control, e.g., injecting fuel at a plurality of timings in a given engine operating region (details thereof will be described later), an electronically-controlled piezoelectric injector capable of being ON/OFF switched at a significantly high speed is used as the injector 10. This makes it possible to control an injection period and an injection timing of fuel to be injected from the injector, with a higher degree of accuracy.

As another feature different from a conventional gasoline engine, in the engine according to this embodiment, a compression ratio is set to a fairly high value. Specifically, a geometrical compression ratio of a conventional direct-injection gasoline engine is in the range of about 9 to 11, whereas the geometrical compression ratio of the engine according to this embodiment is set to about 18 (18 or neighborhood values greater than 18). A substantial compression ratio determined based on a closing timing of the intake valve 8 (effective compression ratio) is variably set in the range of 18 or less, as described later.

With reference to FIGS. 1 and 2, the overall structure of the engine will be further described. An intake passage 13 and an exhaust passage 19 are connected, respectively, to the intake port 6 and the exhaust port 7 of the engine body 1.

The intake passage 13 is a passage for supplying combustion air to the combustion chamber 5. As shown in FIG. 1, the intake passage 13 comprises a plurality of blanch passage portions 14 blanched on a cylinder-by-cylinder basis, and a common passage portion 15 provided on an upstream side of the blanch passage portions 14 in a shared manner.

The exhaust passage is a passage for discharging a burned gas (exhaust gas) generated in the combustion chamber 5. Similarly to the intake passage, the exhaust passage 19 comprises a plurality of blanch passage portions 20 blanched on a cylinder-by-cylinder basis, and a common passage portion 21 provided on a downstream side of the blanch passage portions 20 in a shared manner.

An airflow sensor 60 is provided in the common passage portion 15 of the intake passage 13 at a position upstream of an after-mentioned compressor 27, to detect an amount of intake air flow passing through the common passage portion 15.

A throttle valve 16 is also provided in the common passage portion 15 to adjust an intake air amount. The throttle valve 16 is an electronically-controlled throttle valve adapted to be openably/closably driven by an actuator 17. Specifically, an accelerator-pedal position sensor 64 (FIG. 3) is provided to an accelerator pedal (not shown) to be depressed by a driver, and a desired opening angle of the throttle valve 16 is calculated by an after-mentioned ECU 50 (FIG. 3), based on a detection value of the accelerator-pedal position sensor 64 (i.e., a detected depression degree of the accelerator pedal), an engine operating state, etc. Then, a drive signal corresponding to the calculated opening angle is input into the actuator 17 to drivingly open or close the throttle valve 16.

As shown in FIG. 1, the engine according to this embodiment is provided with two turbochargers (as a supercharging device) consisting of a large-capacity turbocharger 25 and a small-capacity turbocharger 30.

The large-capacity turbocharger 25 comprises a turbine 26 provided in the common passage portion 21 of the exhaust passage 19, a compressor 27 provided in the common passage portion 15 of the intake passage 13, and a connecting shaft 28 connecting the turbine 26 and the compressor 27. When the turbine 26 is rotated by energy received from exhaust gas, the compressor 27 is rotated at high speeds in conjunction with the turbine 26, so that air passing through the intake passage (intake air) is compressed and forcedly supplied to the combustion chamber 5. The compressor 27 is composed of a relatively large impeller. The large-capacity turbocharger 25 adapted to compress intake air by the large compressor 27 exhibits high supercharging performance, primarily in a high engine-speed, high engine-load region where exhaust gas energy is relatively large.

The small-capacity turbocharger 30 comprises a turbine 31 provided in the common passage portion 21 of the exhaust passage 19, a compressor 32 provided in the common passage portion 15 of the intake passage 13, a connecting shaft 33 connecting the turbine 31 and the compressor 32, and an electric motor 34 adapted to rotationally drive the connecting shaft 33. The compressor 32 of the small-capacity turbocharger 30 is composed of an impeller smaller than the compressor 27 of the large-capacity turbocharger 25. Thus, even in an engine operating region where the exhaust gas energy is not so large, the compressor 32 is relatively easily rotated to compress intake air. Further, when an engine load is rapidly increased, e.g., due to acceleration from a low engine-speed, low engine-load region, the electric motor 34 is activated according to need to assist in rotating the compressor 32 to perform supercharging with quick response.

The common passage portion 21 of the exhaust passage 19 is provided with a first bypass pipe 35 for bypassing the turbine 31 of the small-capacity turbocharger 30. A first bypass valve 36 is provided in the first bypass pipe 35. The first bypass valve 36 is adapted to be selectively opened and closed to switch between two exhaust gas paths. Specifically, when the first bypass valve 36 is closed, exhaust gas flows in the turbine 31, so that the turbine 31 and the compressor 32 are rotationally driven. Then, when the first bypass valve 36 is opened, exhaust gas primarily passes through the first bypass pipe 35 (i.e., bypasses the turbine 31), so that a rotation of the turbine 31 and the compressor 32 is suppressed.

Similarly, the common passage portion 15 of the intake passage 10 is provided with a second bypass pipe 37 for bypassing the compressor 32 of the small-capacity turbocharger 30. A second bypass valve 38 is provided in the second bypass pipe 37. The second bypass valve 38 is adapted to be selectively opened and closed to switch between two exhaust gas paths. Specifically, when the second bypass valve 38 is closed, intake air flows in the compressor 32, so that the intake air is compressed. Then, when the second bypass valve 38 is opened, intake air primarily passes through the second bypass pipe 37, so that the intake air bypasses the compressor 32.

Further, an intercooler 18 is provided in the common passage portion 15 of the intake passage 10 at a position downstream of the compressor 32, to cool air which is increased in temperature due to compression.

Figure 3:
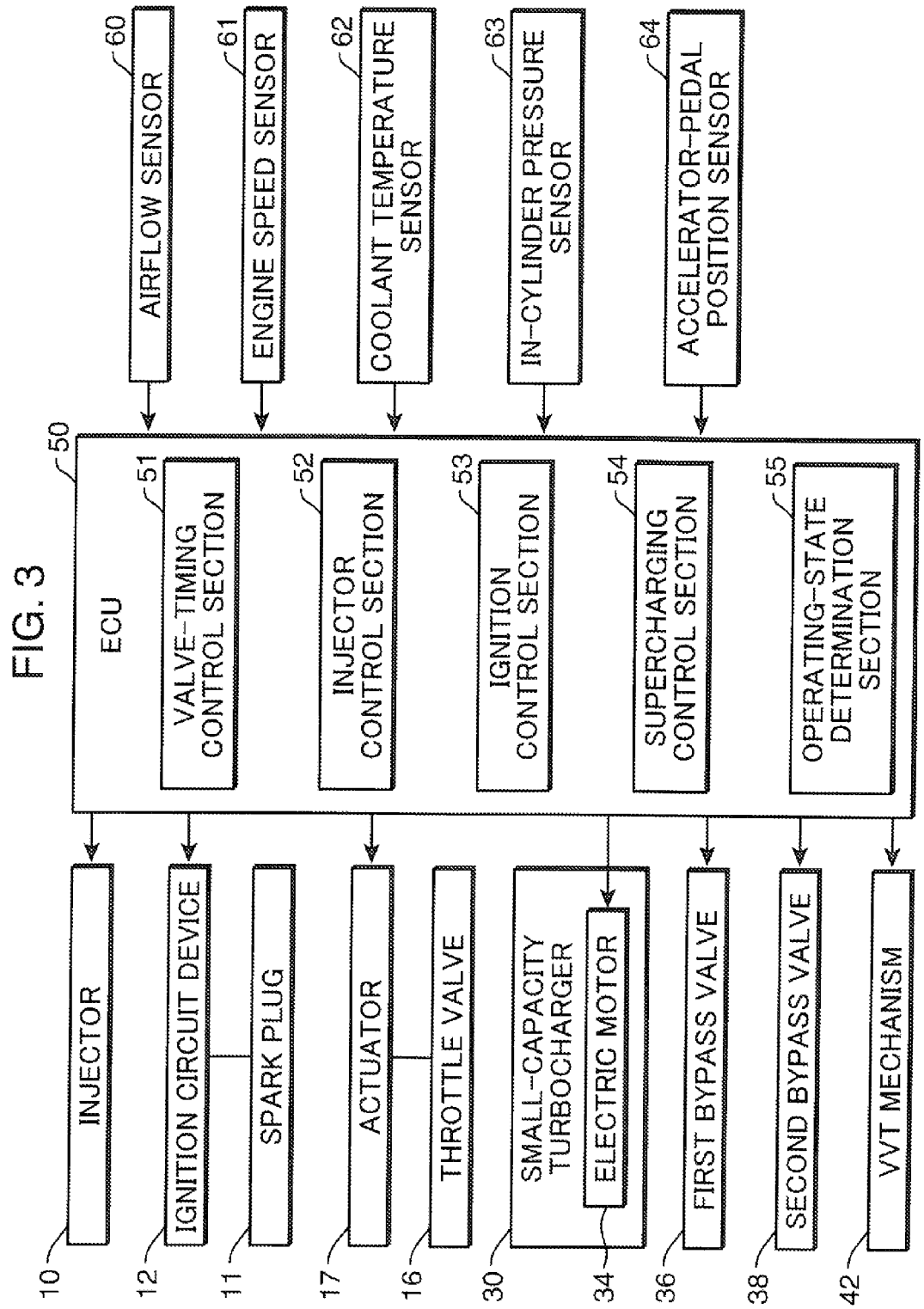
FIG. 3 is a block diagram showing a control system of the engine in FIG. 1.

FIG. 3 is a block diagram showing a control system of the engine. An ECU 50 illustrated in FIG. 3 is a control device for comprehensively controlling respective sections of the engine, and made up of well-known components, such as a CPU, a ROM and a RAM.

A plurality of detection signals from various sensors are input into the ECU 50. Specifically, the ECU 50 is electrically connected to the airflow sensor 60, the engine speed sensor 61, the coolant temperature sensor 62, the in-cylinder pressure sensor 63 and the accelerator-pedal position sensor 64, to allow detection signals from these sensors to be sequentially input thereinto.

Further, the ECU 50 is electrically connected to each of the injectors 10, the ignition circuit device 12 for each of the spark plugs 11, the actuator 17 for the throttle valve 16, the electric motor 34 for the small-capacity turbocharger 30, the first and second bypass valves 36, 38 and the VVT mechanism 42, and adapted to output a drive control signal to each of these devices.

Figure 4:
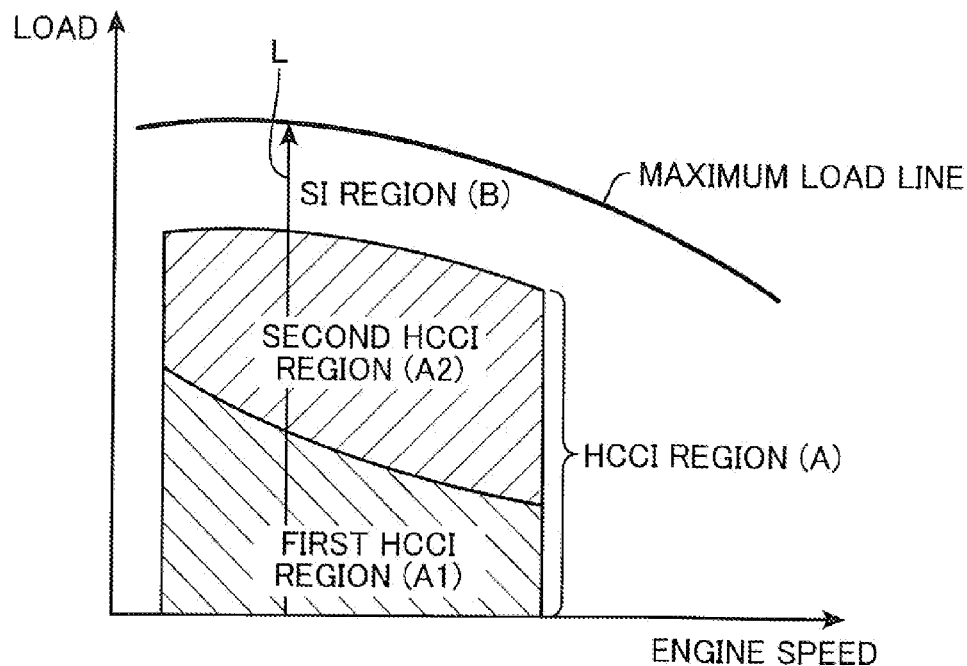
FIG. 4 is a graph showing one example of a control map to be referred to during control for the engine in FIG. 1.

FIG. 4 is a graph showing a control map to be referred to when the ECU 50 controls the engine. In FIG. 4, an HCCI region A set in a relatively wide region except for a high engine-speed region and a high engine-load region is an engine operating region where combustion is triggered by compressed self-ignition, and an SI region B set in a region other than the HCCI region A is an engine operating region where combustion is triggered by spark ignition. Specifically, in the HCCI region A, a combustion process is controlled such that an air-fuel mixture formed by injecting fuel in an intake stroke or the like is self-ignited before or after top dead center of a compression stroke (compression TDC). In the SI region B, combustion is triggered in such a manner that an air-fuel mixture is forcedly ignited by a spark from the spark plug 11.

The reason why the HCCI region A for performing the compressed self-ignited combustion is set in an engine-load region except for a high engine-load region is that, if the compressed self-ignited combustion is forcedly performed in the high engine-load region (i.e., a region having a large amount of fuel), a problem caused by a rapid increase in combustion pressure, such as combustion noise, is likely to occur (the details will be described later). Further, the reason why the HCCI region A is set in an engine-speed region except for a high engine-speed region is that it is difficult to reliably self-ignite an air-fuel mixture due to a relatively short heat-receiving period of fuel in the high engine-speed region.

The HCCI region A is further divided into two regions A1, A2, in accordance with a difference in combustion conditions, such as compression ratio and air-fuel ratio. Specifically, given that the region A1 set on a low engine-load side of the HCCI region A, and the region A2 set on a high engine-load side of the HCCI region A, are defined, respectively, as a first HCCI region A1 and a second HCCI region A2, the compressed self-ignited combustion is performed in both the first and second HCCI regions A1, A2, while changing the combustion conditions, such as compression ratio and air-fuel ratio, therebetween. In this embodiment, the compressed self-ignited combustion is performed while variously changing the combustion conditions to allow an engine operating region capable of the compressed self-ignition to be expanded to a relatively high engine-load side. In regard to a correspondence relationship with elements of the appended claims, the first HCCI region A1 is equivalent to a "first engine operating region" in the appended claims, and the second HCCI region A2 is equivalent to a "second engine operating region" in the appended claims.

Returning to FIG. 3, a specific function of the ECU 50 will be described below. The ECU 50 comprises, as major functional elements, a valve-timing control section 51, an injector control section 52, an ignition control section 53, a supercharging control section 54 and an operating-state determination section 55.

The valve timing control section 51 is configured to control an operation of the VVT mechanism 42 to appropriately change a closing timing of the intake valve 8 depending on an engine operating state. Specifically, the intake valve 8 is normally closed at a timing adjacent to bottom dead center of an intake stroke (intake BDC) on a retard side (at a timing of slightly passing through the intake BDC). However, depending on the engine operating state, the valve-timing control section 51 is operable to drive the VVT mechanism 42 to set the closing timing of the intake valve 8 to a timing significantly retarded relative to the intake BDC. Consequently, a start timing of a compression stroke is retarded, and thereby a substantial compression ratio (effective compression ratio) of the engine is reduced. As above, in this embodiment, means to variably set a compression ratio of the engine ("compression-ratio adjuster" in the appended claims) is made up of the VVT mechanism 42 adapted to change the closing timing of the intake valve 8, and the valve-timing control section 51 configured to control the operation of the VVT mechanism 42. As mentioned above, the geometrical compression ratio of the engine according to this embodiment is about 18. Thus, the effective compression ratio is variably set in the range of 18 or less by the compression-ratio adjuster made up of the VVT mechanism 42 and the valve-timing control section 51.

The injector control section 52 is configured to control a fuel injection operation of the injector 10 to control an injection period (injection amount) and an injection timing of fuel to be injected from the injector 10 into the combustion chamber 5. Particularly, in the engine according to this embodiment where the compression ratio is set to a fairly high value, the injector control section 52 plays a role in appropriately changing the fuel injection timing of the injector 10 depending on the engine operating state to control an increase rate of an in-cylinder combustion pressure (in-cylinder pressure arising from combustion of an air-fuel mixture).

Specifically, in the engine according to this embodiment where the compression ratio is fairly greater than that of a conventional gasoline engine, and the compressed self-ignited combustion is performed in a relatively wide engine operating region, large noise or vibration is likely to occur in a high engine-load region due to a rapid increase in in-cylinder combustion pressure. Therefore, the injector control section 52 is configured to change the fuel injection timing of the injector 10 to a timing causing combustion in the combustion chamber 5 to become slower, to reduce the increase rate of the combustion pressure. As above, in this embodiment, means to control the increase rate of the combustion pressure in the combustion chamber 5 ("dp/dθ controller" in the appended claims) is made up of the injector control section 52 configured to control the fuel injection operation of the injector 10.

The ignition control section 53 is configured to control an electric power supply from the ignition circuit device 12 to the spark plug 11 to control the spark plug 11, such as a spark discharge timing thereof.

The supercharging control section 54 is configured to control respective operations of the electric motor 34 and the first and second bypass valves 36, 38 to control an amount of air to be supercharged by the large-capacity turbocharger 25 and the small-capacity turbocharger 30 (supercharging amount).

The operating-state determination section 55 is configured to determine where an engine operating state specified by an engine load, an engine speed and others based on detection values of the sensors 60 to 64 is located in the control map illustrated in FIG. 1. A result of the determination will reflect on a content of the control to be performed by each of the control sections 51 to 54. Specifically, when the engine operating state is sequentially determined by the operating-state determination section 55, controls of driving respective sections (such as the VVT mechanism 42, each of the injectors 10, each of the ignition circuit devices 12, and the electric motor 34) of the engine are performed under conditions corresponding to a result of the determination, by the valve-timing control section 51, the injector control section 52, the ignition control section 53 and the supercharging control section 54.

Figure 5:
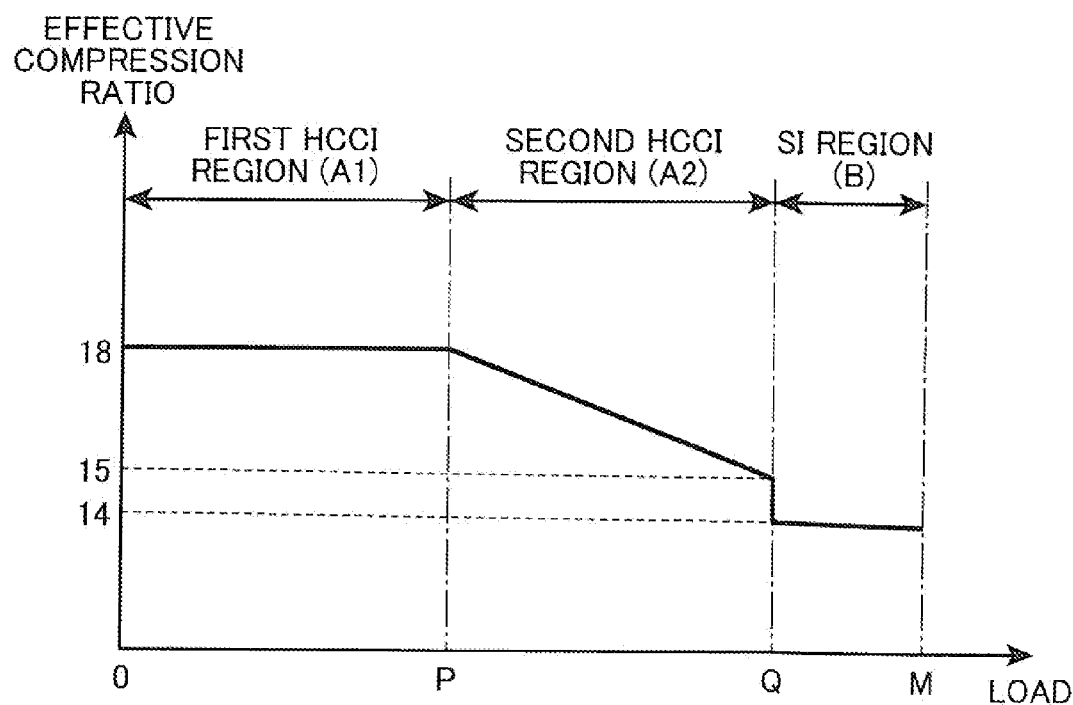
FIG. 5 is a graph showing a change in effective compression ratio depending on an engine load.
Figure 6:
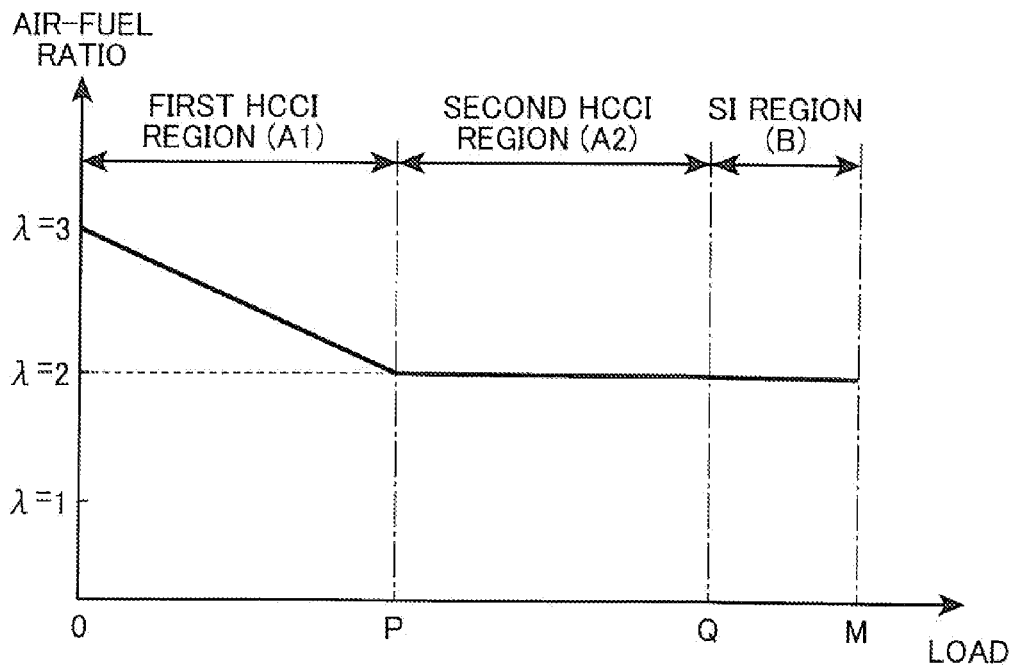
FIG. 6 is a graph showing a change in air-fuel ratio depending on the engine load.
Figure 7:
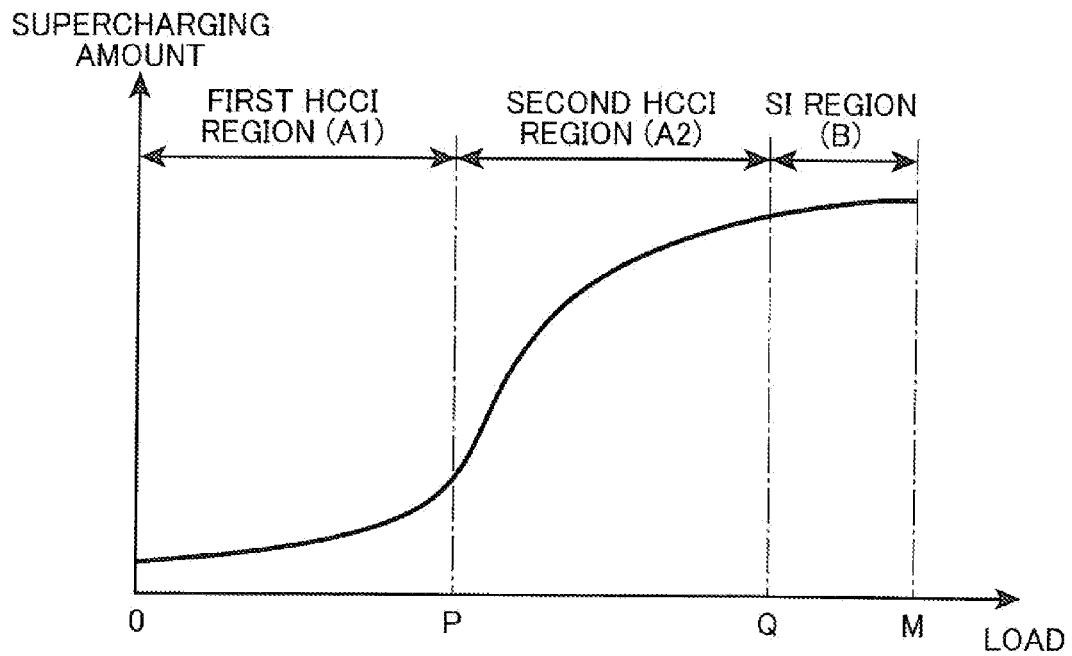
FIG. 7 is a graph showing a change in supercharging amount depending on the engine load.

FIGS. 5 to 7 are graphs showing examples of respective controls of a compression ratio (effective compression ratio), an air-fuel ratio and a supercharging amount, depending on an engine load. In FIGS. 5 to 7, a value of each of the compression ratio, the air-fuel ratio and the supercharging amount is shown as one example of a value to be set in a warmed-up mode of the engine (mode where a temperature of engine coolant is equal to or greater than a given value). Thus, in a warm-up mode of the engine, the value may be appropriately changed.

Specifically, FIGS. 5 to 7 show how each of the compression ratio, the air-fuel ratio and the supercharging amount is changed when the engine operating state is changed as indicated by the line L on the control map in FIG. 4. The line L in FIG. 4 indicates a state when the engine load is changed from a no load condition to a maximum load condition in an engine-speed region having the HCCI region A therein. Thus, the engine is operated based on compressed self-ignited combustion, and then shifted to the spark-ignited combustion along with an increase in engine load.

Firstly, with reference to FIG. 5, a change in the compression ratio (effective compression ratio) will be described below. In FIG. 5, a load point as a boundary between the first HCCI region A1 and the second HCCI region A2, a load point as a boundary between the second HCCI region A2 and the SI region B, and a maximum load point as an upper limit of the SI region B, are indicated by P, Q and M, respectively.

As shown in FIG. 5, the effective compression ratio is kept at 18, in the first HCCI region A1, and then gradually reduced from 18 to 15 along with an increase in engine load, in the second HCCI region A2. Then, in the SI region B, the effective compression ratio is further reduced to 14. More specifically, the effective compression ratio is constantly kept at 18 (i.e., at a value equivalent to the geometrical compression ratio of the engine) in the range of an origin of the graph in FIG. 5 (no load condition) to the load point P as the boundary between the first HCCI region A1 and the second HCCI region A2. Then, the effective compression ratio is gradually reduced on a high engine-load side relative to the load point P, in such a manner as to reach 15 at the load point Q as the boundary between the second HCCI region A2 and the SI region B. Then, just after the load point Q, the effective compression ratio is further reduced to 14, and subsequently kept at 14 until the maximum load point M.

As above, the effective compression ratio is gradually reduced in the second HCCI region A2 and the SI region B, on the high engine-load side relative to the load point P. The reason is to prevent the occurrence of noise, knocking or the like due to an excessive increase in in-cylinder temperature/pressure. The above change characteristic of the compression ratio can be obtained by control of the closing timing of the intake valve 8 based on the valve-timing control section 51 and the VVT mechanism 42.

Secondly, with reference to FIG. 6, a change in the air-fuel ratio will be described below. In FIG. 6, λ is variably set in the range of 2 to 3 in the first HCCI region A1, wherein λ is an excess air factor as a ratio of an actual air-fuel ratio to a stoichiometric air-fuel ratio. Further, in the second HCCI region A2 and the SI region B, the excess air factor λ is constantly kept at 2. In other words, in FIG. 6, a lean air-fuel ratio, i.e., an excess air factor $\lambda \geq 2$, is kept in the entire engine-load region, as shown.

Specifically, in the no load condition, the excess air factor λ is set to 3. Then, the excess air factor λ is gradually reduced (i.e., the air-fuel ratio is enriched) along with an increase in engine load in such a manner as to reach 2 at the load point P as the boundary between the first HCCI region A1 and the second HCCI region A2. In the second HCCI region A2 and the SI region B on the high engine-load side relative to the load point P (i.e., in the range of the load point P to the maximum load point M), the excess air factor λ is constantly kept at 2. This change characteristic of the air-fuel ratio can be obtained by control of the fuel injection amount of the injector 10 based on the injector control section 52.

Thirdly, in regard to a change in the supercharging amount, as shown in FIG. 7, the supercharging amount is set to a low value (i.e., air intake is performed almost in a natural intake mode) in the first HCCI region A1. In the second HCCI region A2 and the SI region B, the supercharging amount is largely increased along with an increase in engine load. Specifically, in this embodiment, the excess air factor λ as a ratio of an actual air-fuel ratio to a stoichiometric air-fuel ratio is kept at 2 without any change in the second HCCI region A2 and the SI region B. Thus, in order to adequately ensure an engine output power (i.e., increase the fuel injection amount) while maintaining such a lean air-fuel ratio, it is necessary to send a large amount of air to the combustion chamber in the second HCCI region A2 and the SI region B. As measures therefor, the supercharging amount is largely increased.

More specifically, considering that the excess air factor λ in the second HCCI region A2 and the SI region B is constantly kept at 2, it is necessary to forcedly send air in an amount up to two times or more greater than that in a natural intake mode, in order to obtain an engine output power equal to or greater than that in the stoichiometric air-fuel ratio. Therefore, in this embodiment, a supercharging characteristic of the large-capacity turbocharger 25 and the small-capacity turbocharger 30 is set to allow air to be supplied to the combustion chamber 5 in an amount up to two times or more greater than that in the natural intake mode.

In order to obtain the supercharging characteristic as shown in FIG. 7, each of the large-capacity turbocharger 25 and the small-capacity turbocharger 30 is used in a different manner as follows. When the engine speed is increased up to a certain level, an amount of exhaust gas flow becomes larger. Thus, the large-capacity turbocharger 25 starts rotating along with an increase in engine load, and the supercharging amount is largely increased in a medium to high engine-load region by an action of the large-capacity turbocharger 25, so that the supercharging characteristic as shown in FIG. 7 is obtained. Therefore, basically, in an engine-speed region higher than a certain level, it is not necessary to operate the small-capacity turbocharger 30, and thereby both the first and second bypass valves 36, 38 are opened. Differently, when an engine-speed is relatively low, even if the engine load is increased, the large-capacity turbocharger 25 is not effectively operated, and thereby a sufficient supercharging effect cannot be obtained. Thus, it is necessary to close both the first and second bypass valves 36, 38 so as to operate the small-capacity turbocharger 30. The small-capacity turbocharger 30 is excellent in response, so that it can be rotated along with an increase in engine load even in the low engine-speed region to provide a supercharging characteristic similar to the above supercharging characteristic. In this case, the electric motor 34 is operated according to need to assist the rotation of the small-capacity turbocharger 30.

Conditions for producing the compressed self-ignited combustion will be briefly discussed below. Whether or not the compressed self-ignited combustion is produced depends on a plurality of parameters comprising an in-cylinder temperature, an in-cylinder pressure and an air-fuel ratio. Specifically, the compressed self-ignited combustion is more likely to be produced as the in-cylinder temperature and/or the in-cylinder pressure become higher. Further, the compressed self-ignited combustion is more likely to be produced as the air-fuel ratio becomes richer.

Figure 12:
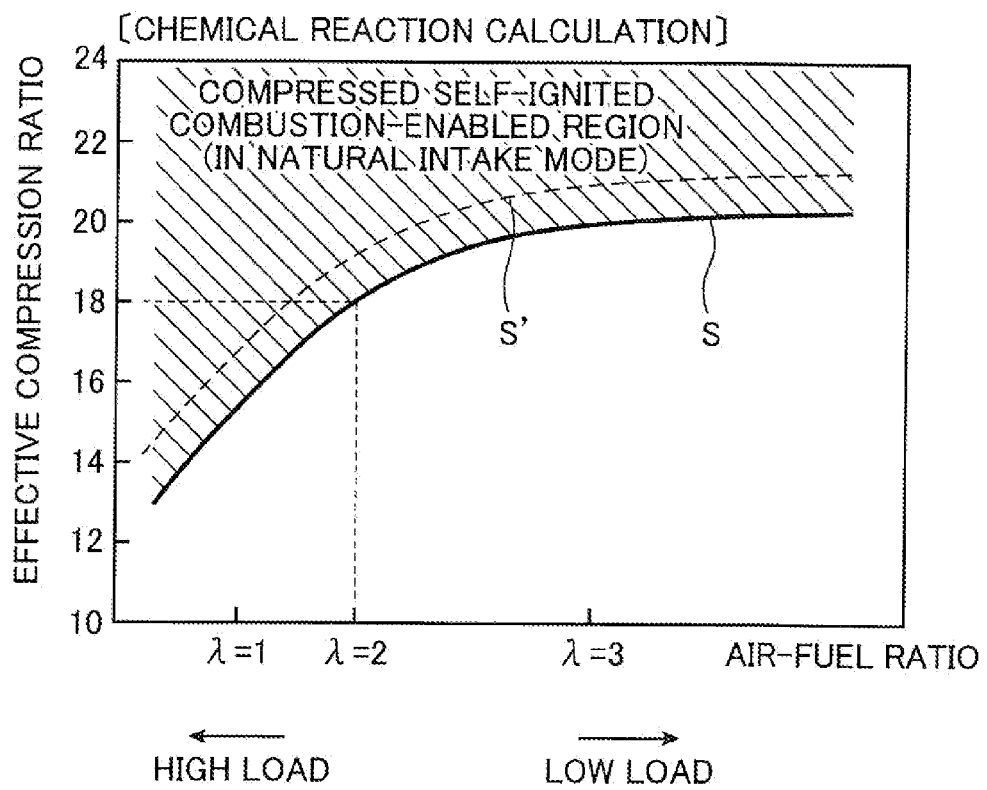
FIG. 12 is a graph showing a region where combustion based on compressed self-ignition can be utilized in a naturally-aspirated (natural-intake) engine having no supercharging device.

FIG. 12 shows a region capable of combustion based on compressed self-ignition (compressed self-ignited combustion-enabled region) in a naturally-aspirated (natural-intake) engine having no supercharging device, as reference for facilitating understanding of a characteristic of the compressed self-ignition. In FIG. 12, the horizontal axis represents an excess air factor λ, and the vertical axis represents an effective compression ratio. The line S in FIG. 12 indicates a lower-limit line of the compressed self-ignited combustion calculated based on a chemical reaction calculation. This means that, in theory, the compressed self-ignition can be induced in a region on an upper side (high compression-ratio side) relative to the lower-limit line S. This lower-limit line S is based on a chemical reaction calculation performed on condition that an amount of internal EGR (an amount of burned gas to be partly left in the combustion chamber 5 in order to facilitate compressed self-ignition) is zero.

In a natural-intake engine, after an intake air amount reaches an upper limit thereof, an air-fuel ratio is more enriched along with an increase in fuel. An engine output power is adjusted by increasing or reducing the air-fuel ratio in this manner, so that a value of the excess air factor λ on the horizontal axis is set in proportion to an engine load. This means that the engine load is relatively low on a right side of the horizontal axis where the excess air factor λ is relatively large, and the air-fuel ratio is relatively lean, whereas the engine load is relatively high on a left side of the horizontal axis where the excess air factor λ is relatively small, and the air-fuel ratio is relatively rich.

As can be seen from the lower-limit line S in FIG. 12, the compression ratio required for inducing the compressed self-ignition becomes larger in a low engine-load region where the air-fuel ratio becomes leaner (i.e., the excess air factor λ becomes larger). Specifically, if the air-fuel ratio becomes leaner, the compressed self-ignition becomes less likely to be induced. Thus, in order to induce the compressed self-ignition under such a lean air-fuel ratio, it is necessary to increase the effective compression ratio to achieve a higher temperature/pressure in the combustion chamber. However, if the effective compression ratio is excessively increased, a combustion reaction will be sharply accelerated to cause a problem, such as noise. The dashed line S' in FIG. 12 indicates an upper limit of the compression ratio estimated in view of noise. This upper-limit line S' is located at a position relatively adjacent to the lower-limit line S of the compressed self-ignition. For this reason, it can be said that it is desirable to induce the compressed self-ignition at a position adjacent to and as close as possible to the lower-limit line S.

Based on the above characteristic of the compressed self-ignition, details of the compressed self-ignited combustion to be performed in this embodiment will be specifically verified. Firstly, in the first HCCI region A1 set on the low engine-load side of the HCCI region A, the effective compression ratio is set to about 18, and the excess air factor λ as a ratio of an actual air-fuel ratio to a stoichiometric air-fuel ratio is set in the range of 2 to 3, as shown in FIGS. 5 and 6. Further, in the first HCCI region A1, the supercharging amount is not significantly increased, so that the air intake is performed in a manner close to a natural intake mode, as shown in FIG. 7.

As can be seen from FIG. 12, under the above combustion conditions, it is originally difficult to naturally induce the compressed self-ignition. Specifically, in FIG. 12, under a lean air-fuel ratio corresponding to an excess air factor λ of greater than 2, the compressed self-ignition is not induced unless the effective compression ratio is increased up to a value greater than 18 (e.g., about 20). In contrast, in the first HCCI region A1, the effective compression ratio is constantly set to 18 even under a lean air-fuel ratio corresponding to an excess air factor λ of greater than 2. Thus, the temperature/pressure in the combustion chamber 5 is not increased up to a level enough to induce the compressed self-ignition, and thereby misfire is likely to occur.

Therefore, in this embodiment, in order to reliably induce the compressed self-ignition even under the above conditions, an ignition assist is performed in at least a part of the first HCCI region A1 on a low engine-load side. The ignition assist is intended to allow the ignition plug 11 to assistively generate spark discharge before initiation of the compressed self-ignition so as to facilitate the compressed self-ignition. This makes it possible to stably perform the compressed self-ignited combustion in the first HCCI region A1, while reliably preventing misfire.

Secondly, the compressed self-ignited combustion in the second HCCI region A2 will be described below. In the second HCCI region A2, the effective compression ratio is gradually reduced from 18 to 15, and the excess air factor λ is constantly kept at 2, as shown in FIGS. 5 and 6. Further, in the second HCCI region A2, the supercharging amount is increased along with an increase in engine load, as shown in FIG. 7.

Differently from the first HCCI region A1, under the above combustion conditions, it is believed that the compressed self-ignition is reliably induced without relying on the ignition assist. Specifically, in the second HCCI region A2, the engine load is relatively high (i.e., combustion energy is relatively large), and the supercharging amount is relatively large, so that the temperature/pressure in the combustion chamber becomes higher. Thus, the compressed self-ignition would be naturally induced without the ignition assist.

Figure 13:
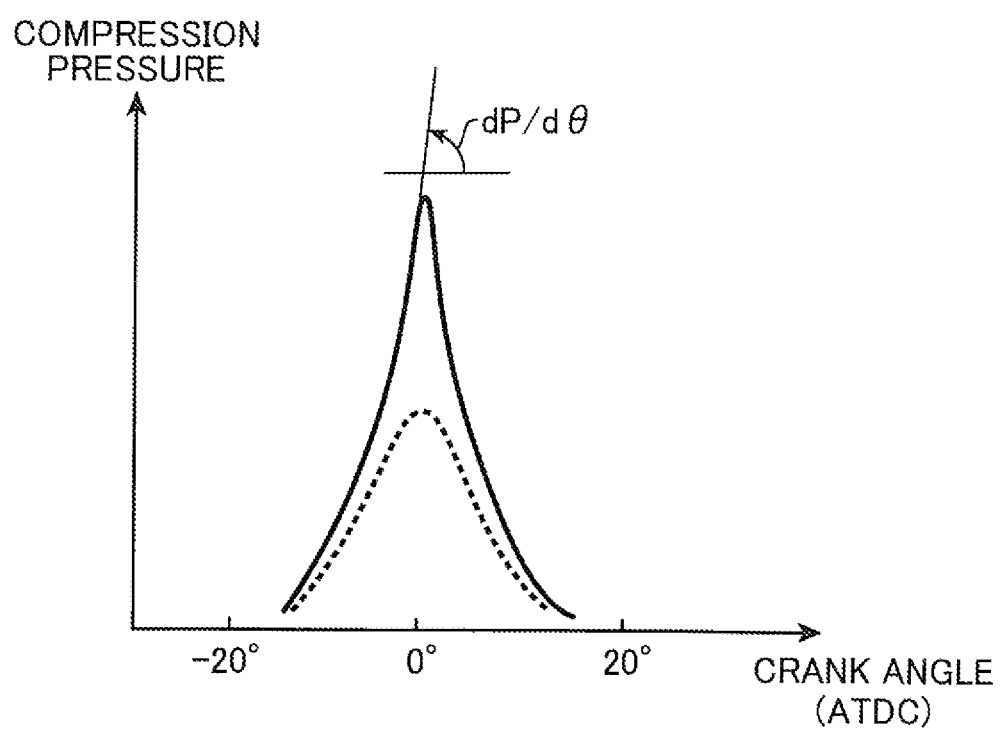
FIG. 13 is a graph showing an increase rate of combustion pressure which occurs when combustion is performed in a high engine-load region based on the block injection mode.

However, in the second HCCI region A2, particularly in a part of the second HCCI region A2 on a high engine-load side, a combustion pressure caused by the compressed self-ignition is rapidly increased, and thereby relatively large combustion noise similar, for example, to diesel knock, is likely to occur. Specifically, in the second HCCI region A2 set on a high engine-load side relative to the first HCCI region A1, a large amount of fuel suited to the engine load is injected from the injector 10, so that total energy to be generated from combustion is relatively large, and the large combustion energy is generated within a short period of time. Thus, an in-cylinder combustion pressure would be rapidly increased as indicated by the solid waveform in FIG. 13. Consequently, an increase rate dp/dθ of the combustion pressure, which is indicative of how much the combustion pressure is increased within a crank angle of 1 degree, becomes larger than that during the combustion in the first HCCI region A1 (indicated by the dashed line), and large combustion noise is likely to occur due to the increase in increase rate of the combustion pressure.

It is essential to take measures to suppress such combustion noise. For this purpose, in this embodiment, the effective compression ratio in the second HCCI region A2 is gradually reduced from 18 to 15 (see FIG. 5). However, even if the effective compression ratio is simply reduced in this manner, there is a possibility that the increase rate (dp/dθ) of the combustion pressure is not sufficiently reduced to still cause combustion noise.

Therefore, in this embodiment, in at least a part of the second HCCI region A2 on a high engine-load side, the fuel injection of the injector 10 is performed at a plurality of stages (i.e., in a split injection mode) to continuously perform combustion with relatively low energy to reduce the increase rate (dp/dθ) of the combustion pressure as a whole.

Before describing the above split injection mode in detail, a combustion mode in the first HCCI region A1 where the compressed self-ignited combustion is performed by injecting fuel once in block (in a block injection mode) will be described.

Figure 8A:
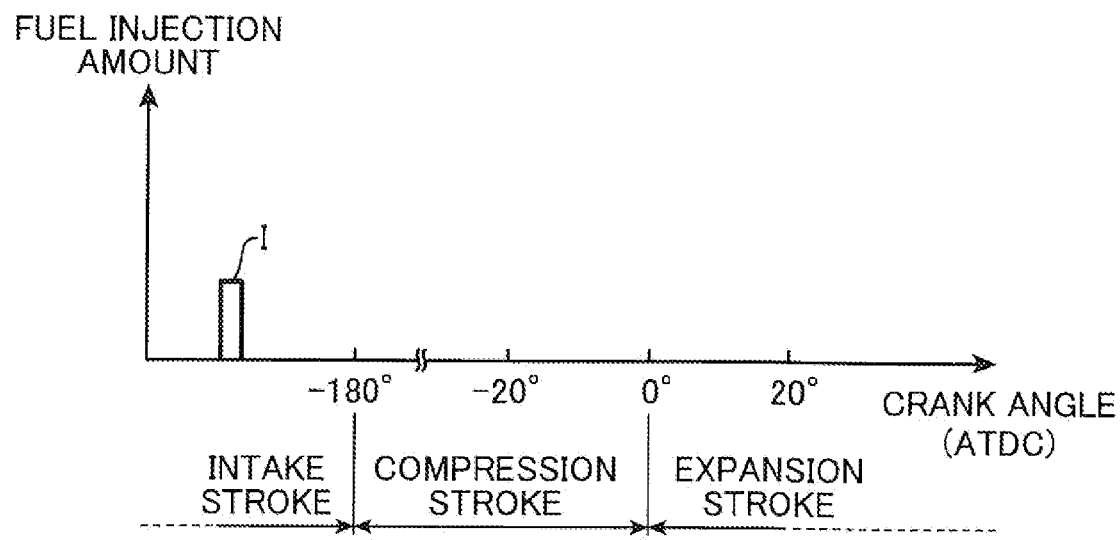
Figure 8B:
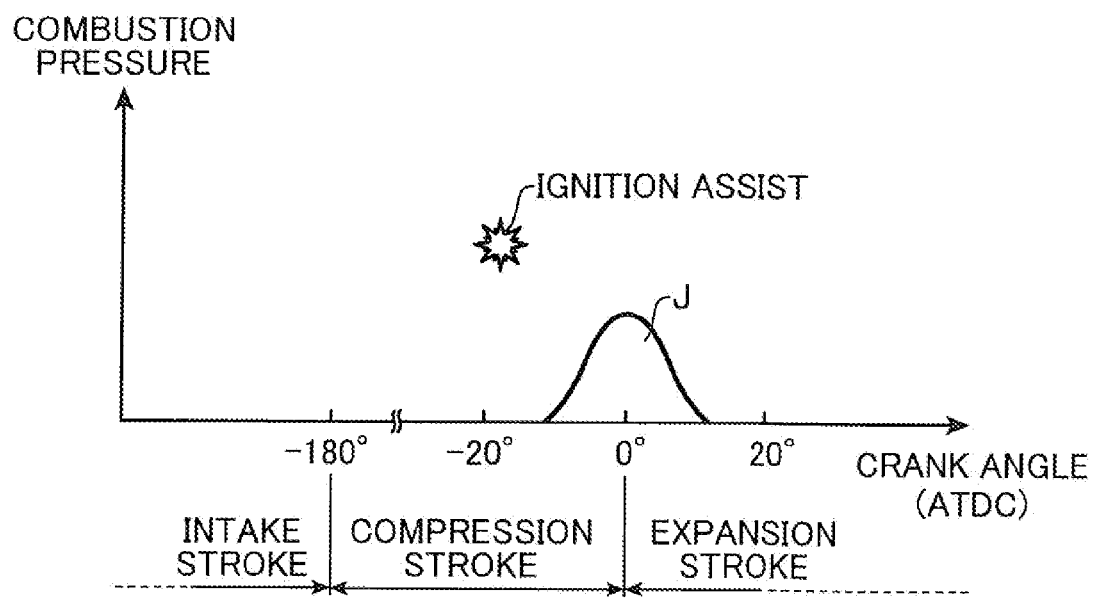

FIGS. 8A and 8B are graphs showing a fuel injection timing and a fuel injection amount in the first HCCI region A1, and a change in resulting combustion pressure, in the form of a relationship with a crank angle after compression TDC. As shown in FIGS. 8A and 8B, in the first HCCI region A1, a given amount of fuel is injected at a single timing in an intake stroke (I in FIG. 8A), and the fuel is sufficiently stirringly mixed with air over a subsequent given crank-angle range, so that a homogeneous air-fuel mixture is formed in the combustion chamber 5. Then, the formed air-fuel mixture is increased in temperature/pressure through a compression stroke, and compressed self-ignited combustion is produced just before compression TDC (J in FIG. 8B) in such a manner that a combustion pressure is increased over a given crank-angle range across the compression TDC. In this process, according to need, (particularly in a part of the first HCCI region A1 on a low engine-load side), the ignition assist by the spark plug 11 is performed to assist self-ignition of the air-fuel mixture.

Figure 9A:
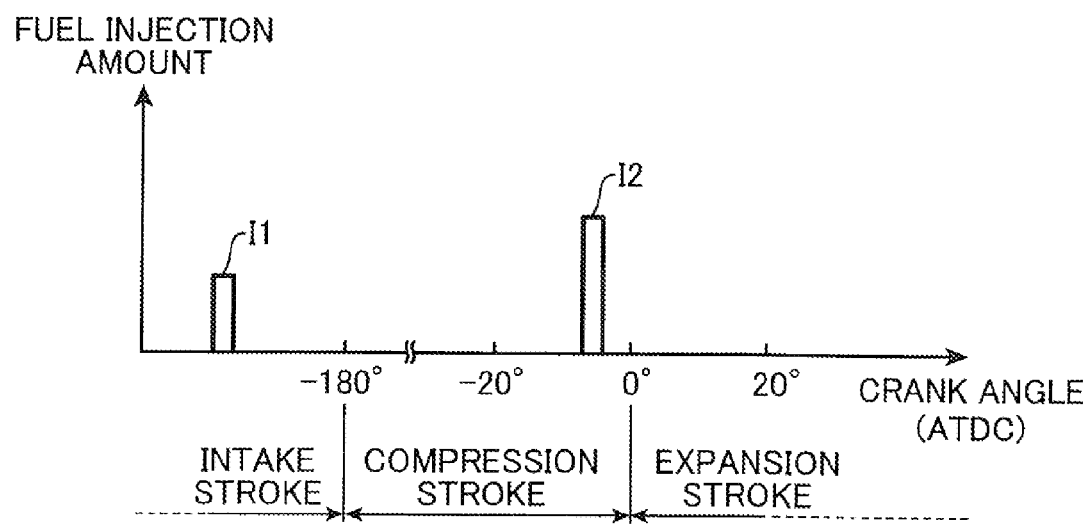
Figure 9B:
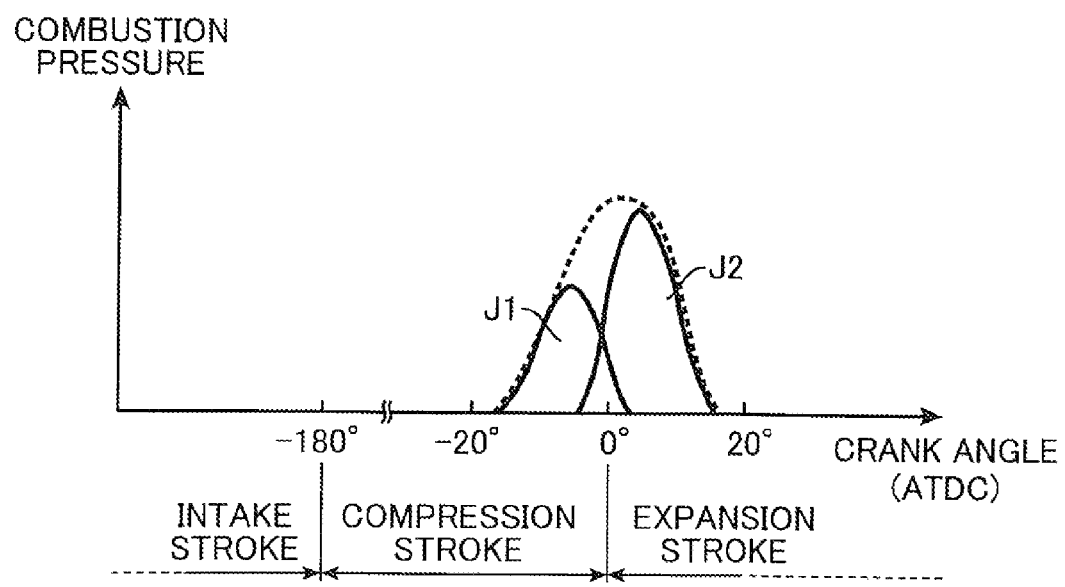

In the second HCCI region A2, particularly in a part of the second HCCI region A2 on a high engine-load side, the fuel injection amount is increased. Thus, if fuel is injected once in block as shown in FIG. 8A, combustion with large energy is produced within a short period of time to cause combustion noise. Therefore, in at least a part of the second HCCI region A2 on a high engine-load side, as shown in FIGS. 9A and 9B, fuel is injected in at a plurality of stages to successively produce a plurality of compressed self-ignited combustions. FIGS. 9A and 9B show one example where fuel is injected in two stages (two-stage split injection mode).

Specifically, in the example illustrated in FIGS. 9A and 9B, a small amount of fuel less than an amount of required fuel (a fuel injection amount suited to an engine load) is injected once in an intake stroke (I1 in FIG. 9A). Consequently, compressed self-ignited combustion with a low peak pressure corresponding to the fuel injection amount is produced just before compression TDC (J1 in FIG. 9B). Then, at a timing when the 1st compressed self-ignited combustion (J1) is produced, fuel is supplied in an amount greater than that of the 1st fuel injection (I1) by a 2nd fuel injection (I2 in FIG. 9A). Consequently, compressed self-ignited combustion (J2 in FIG. 9B) with a peak pressure higher than that of the 1st compressed self-ignited combustion (J1) is produced in succession with the 1st compressed self-ignited combustion.

The operation of performing the 2nd fuel injection (I2) at the timing when the 1st compressed self-ignited combustion (J1) is produced, is achieved by control of the ECU 50 based on a detection value of the in-cylinder pressure sensor 63. Specifically, when the 1st compressed self-ignited combustion (J1) is produce, an internal pressure of the combustion chamber 5 is instantaneously increased, and this increase in the pressure is detected by the in-cylinder pressure sensor 63. In response to receiving the detection signal from the in-cylinder pressure sensor 63, the ECU 50 (more specifically, the injector control section 52) instantaneously outputs a drive signal to the injector 10. Then, in response to receiving the drive signal, the injector 10 injects a given amount of fuel as the 2nd fuel injection. As a prerequisite to completing the 2nd fuel injection (I2) before completion of the 1st compressed self-ignited combustion (J1), the injector 10 is essentially required to have excellent output response. In this embodiment, an electronically-controlled piezoelectric injector is used as the injector 10 as mentioned above, so that the above accurate fuel injection control can be performed without any problem.

In the second HCCI region A2, fuel is injected in the split injection mode to successively produce a plurality of compressed self-ignited combustions, as shown in FIGS. 9A and 9B, so that a pressure distribution similar to that in a single combustion having a long combustion period is obtained. Thus, it becomes possible to effectively prevent combustion noise which would otherwise occur due to a rapid increase in combustion pressure, while generating large combustion energy in total to ensure an adequate engine output power suited to an engine load.

However, it is assumed that, for example, in a part of the second HCCI region A2 on a maximum engine-load side (on the side close to the SI region B), a noise suppression effect cannot be obtained by injecting fuel in only two stages (two-stage split injection mode) as in the example illustrated in FIGS. 9A and 9B. In this case, the number of stages of fuel injection may be further increased.

Figure 10A:
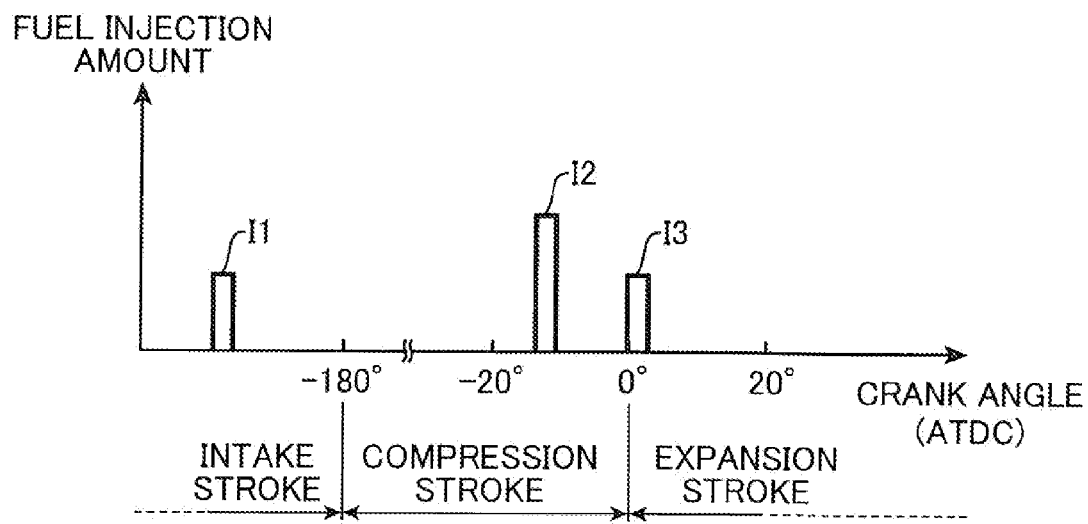
Figure 10B:
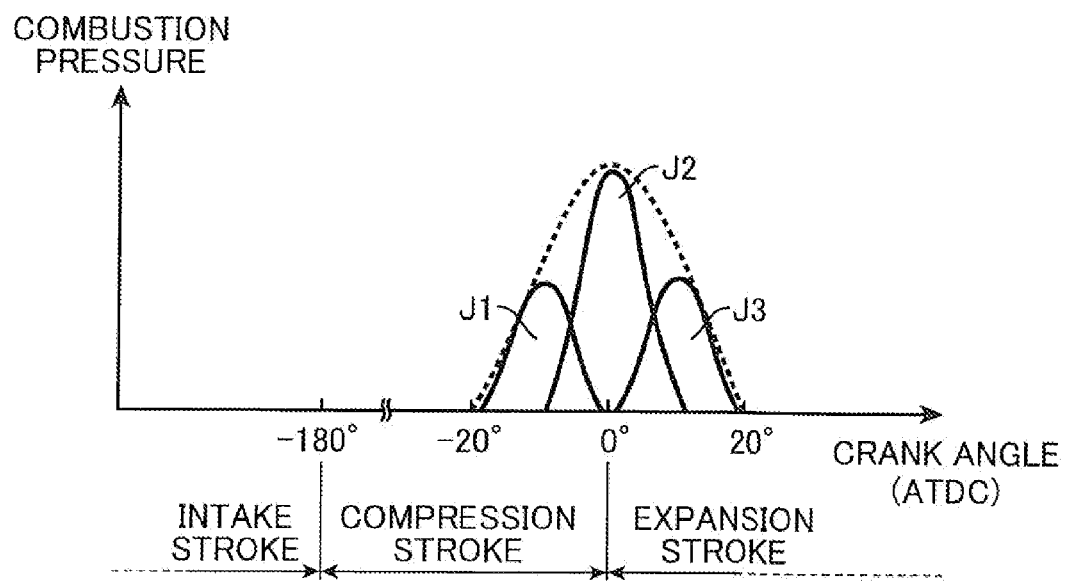

FIGS. 10A and 10B illustrate three compressed self-ignited combustions (J1, J2, J3) to be produced when fuel is injected in three stages (I1, I2, I3). In cases where the number of stages is increased to three (three-stage split injection mode), combustion energy greater that in the two-stage split injection mode can be ensured, and the rapid increase in combustion pressure can be more effectively suppressed. Thus, even if the second HCCI region A2 is fairly expanded toward a high engine-load side, the number of stages of fuel injection can be increased along with an increase in engine load so as to effectively prevent combustion noise while ensuring high engine output power suited to an engine load.

In the examples illustrated in FIGS. 9A and 9B and FIGS. 10A and 10B, the split injection mode where fuel is injected in a plurality of stages is performed to suppress the rapid increase in combustion pressure due to the compressed self-ignition. However, a specific means for slowing combustion is not limited thereto. For example, even in the block injection mode where fuel is injected once in block as shown in FIGS. 8A and 8B, an injection timing of the fuel may be retarded. In this injection-timing retard mode, the compressed self-ignition becomes less likely to be induced, which makes it possible to slow a combustion speed to some extent to extend a combustion period. Although a combustion slowing effect in the injection-timing retard mode is less than that in the split injection mode, the injection-timing retard mode can be effectively used to slow a combustion speed, only in an engine-load region below a certain level.

In the split injection mode as shown in FIGS. 9A and 9B and FIGS. 10A and 10B, the fuel injection (I1) to be performed before producing the 1st compressed self-ignited combustion (J1) is not necessarily configured to inject fuel in a single stage, but may be configured to inject fuel in a plurality of sub-stages. Considering such a split injection mode, the fuel injection (I1) to be performed before the 1st compressed self-ignited combustion (J1) will hereinafter be referred to collectively as "initial injection", and the fuel injection(s) (I2 in FIG. 9A or I2 and I3 in FIG. 10A) to be performed on or after the 1st compressed self-ignited combustion (J1) will hereinafter be referred to collectively as "last injection".

As a prerequisite to increase the engine output power along with an increase in engine load, it is necessary to increase a total fuel injection amount depending on the engine load. In the split injection mode, it is preferable that a fuel injection amount in the initial injection (I1) is kept approximately constant, regardless of the engine load.

Specifically, in the second HCCI region A2, the supercharging amount is increased along with an increase in engine load, and thus an amount of intake air flowing in the combustion chamber 5 is increased. Thus, if the fuel injection amount in the initial injection (I1) (initial injection amount) is kept constant, an air-fuel ratio based on the initial injection amount becomes leaner along with an increase in engine load. Consequently, an amount of heat to be generated by the 1st compressed self-ignited combustion (J1) is reduced, and an internal temperature/pressure of the combustion chamber 5 at a timing of the last injection (I2 in FIG. 9A) is suppressed. This makes it possible to suppress a sharp increase in reaction speed of the 2nd or n-th (n: an integer of 3 or more) compressed self-ignited combustion (e.g., J2 in FIG. 9B) based on the last injection, to effectively prevent the occurrence of combustion noise due to a rapid increase in combustion speed.

However, there is a limit to a combustion-noise prevention effect based on the split injection mode. Thus, if the compressed self-ignited combustion is continued through a region close to a maximum engine-load line, where it is necessary to inject a large amount of fuel, more intense combustion is likely to be produced, resulting in the occurrence of large combustion noise. Therefore, in this embodiment, combustion controlled by the spark ignition is performed in the SI region B set around the maximum engine-load line as shown in FIGS. 4 to 7, to prevent the occurrence of the above combustion noise.

A combustion mode in the SI region B will be briefly described. In the SI region B, an air-fuel mixture is forcedly ignited by the spark ignition based on the spark plug 11, and burned. However, as shown in FIG. 6, even in a part of the SI region B close to the maximum engine-load line, the excess air factor $\lambda$ as a ratio of an actual air-fuel ratio to a stoichiometric air-fuel ratio is kept at 2. Thus, if the spark ignition is performed in a conventional manner, misfire is likely to occur.

Therefore, in this embodiment, multi-spark ignition designed to control the spark plug 11 to successively generate spark discharge plural times is performed in the SI region B. Specifically, successive spark discharges are performed in such a manner that, after discharging spark from the spark plug 11, another spark is discharged into the previous spark, to increase energy of a flame kernel so as to reliably produce combustion.

Further, differently from the combustion modes in the first and second HCCI regions A1, A2, in the SI region B, the effective compression ratio is reduced to 14, as shown in FIG. 5. This makes it possible to suppress an excess increase in in-cylinder temperature/pressure to prevent abnormal combustion, such as knocking, while reliably igniting an air-fuel mixture by the multi-spark ignition.

Basically, the number of fuel injections in the SI region B may be set to one. However, for example, during an engine operation at a maximum load, fuel may be injected in a plurality of stages (in a split injection mode) in the same manner as that in the second HCCI region A2. In the split injection mode, injected fuel and intake air in the cylinder are efficiently mixed together, and vaporization of the fuel is accelerated. Thus, it can be expected to obtain an advantage of being able to cool the air-fuel mixture by a latent heat of the vaporization so as to prevent abnormal combustion, such as knocking.

Further, strong turbulences are created in the cylinder by the fuel injection. Thus, it can be expected to obtain an advantage of being able to increase a flame propagation speed so as to prevent abnormal combustion, such as knocking.

Figure 11:
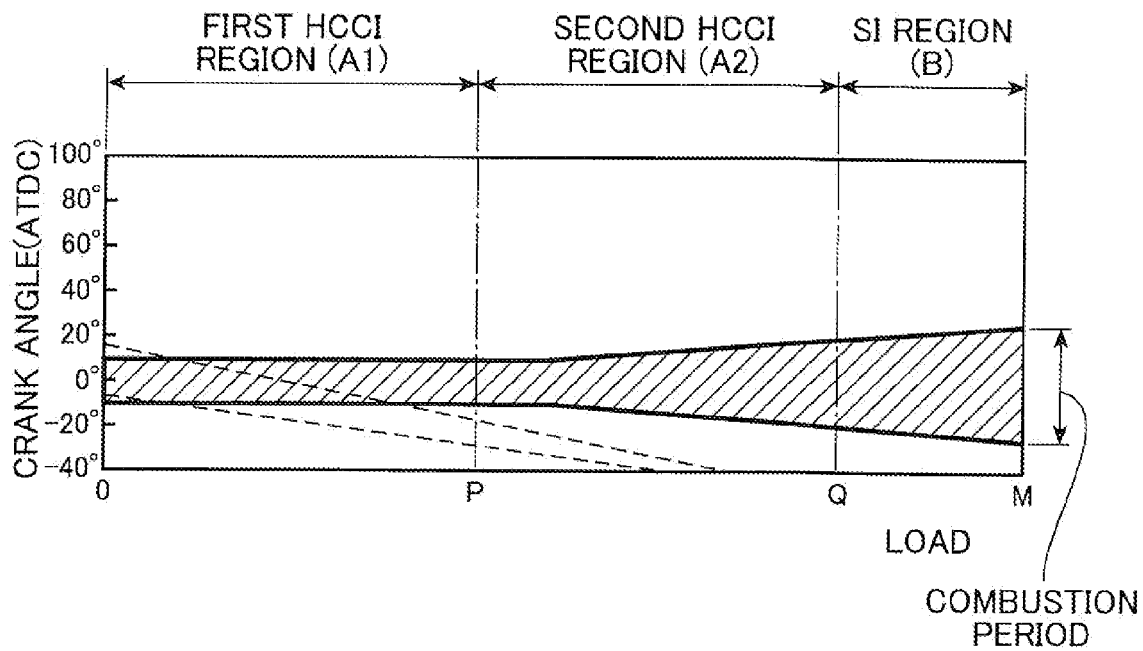
FIG. 11 is a graph showing a combustion mode to be achieved by control of the compression ratio, the air-fuel ratio, the supercharging amount and the fuel injection timing as shown in FIGS. 5 to 10B, in the form of a relationship between an engine load and a combustion period.

FIG. 11 is a graph showing a combustion mode to be achieved by control of the compression ratio, the air-fuel ratio, the supercharging amount and the fuel injection timing for each of the engine operating regions (A1, A2, B), in the form of a relationship between an engine load and a combustion period. As seen in FIG. 11, combustion is produced in a given crank-angle range across compression TDC, regardless of the engine load. Particularly, in a medium engine-load, high engine-load region (the second HCCI region A2 and the SI region B), the fuel injection in the split injection mode, and the multi-spark ignition, are performed, and the effective compression ratio is reduced, to slow a combustion speed to extend a combustion period. In this manner, the increase rate (dp/dθ) of the combustion pressure is reduced to effectively suppress combustion noise.

A region indicated by the dashed lines in FIG. 11 shows a combustion period in case where conventional compressed self-ignited combustion is continued through a high engine-load region. The conventional compressed self-ignited combustion means combustion produced in such a manner that a so-called negative overlap period where both the intake and exhaust valves 8, 9 are closed, is provided in an exhaust stroke to leave a given amount of burned gas in the combustion chamber 5 (internal EGR), and fuel is directly injected into the combustion chamber 5 having an temperature increased by the internal EGR to allow a resulting air-fuel mixture to be self-ignited. In the compressed self-ignited combustion using the internal EGR, a combustion reaction becomes excessively sensitive along with an increase in engine load, and thereby combustion is completed within a short period of time. Thus, the increase rate of the combustion pressure is excessively increased to generate large combustion noise. This causes a problem that compressed self-ignited combustion can be performed only in a low engine-load region. In contrast, in this embodiment, the effective compression ratio, the fuel injection timing and others are appropriately adjusted to control compressed self-ignited combustion without using the internal EGR. This makes it possible to expand a region (the first and second HCCI regions A1, A2) capable of operating the engine using compressed self-ignited combustion, to a high engine-load region, while effectively preventing the occurrence of the above combustion noise.

As described above, the supercharged direct-injection engine according to the above embodiment is designed as follows. In the first HCCI region A1 including a low engine-load region, the effective compression ratio is increased up to 18 to increase a temperature/pressure in the combustion chamber 5 to allow compressed self-ignited combustion to be performed under an extremely lean air-fuel ratio corresponding to an excess air factor λ of 2 to 3. Thus, it becomes possible to control a combustion temperature of an air-fuel mixture at a low level to reduce NOx emission from the combustion chamber 5, while effectively reducing fuel consumption. Further, in the second HCCI region A2 on a high engine-load side relative to the first HCCI region A1, the supercharging amount is increase to keep the excess air factor λ at 2, and compressed self-ignited combustion is performed under such a lean air-fuel ratio. This provides an advantage of being able to adequately ensure a high engine output power suited to the engine load, while reducing fuel consumption and NOx emission.

In the above embodiment, when the compressed self-ignited combustion is performed in the second HCCI region A2, the effective compression ratio is reduced from 18 to 15, and fuel is injected in the split injection mode to slow a combustion speed. This provides an advantage of being able to reduce a maximum value of an in-cylinder temperature/pressure in proportion to the effective compression ratio, and suppress a rapid increase in combustion pressure by slowing the combustion speed, so as to effectively prevent combustion noise (large noise similar to diesel knock) which would otherwise be caused by the rapid increase in combustion pressure.

Further, in the above embodiment, a lean air-fuel ratio corresponding to an excess air factor λ of 2 or more is kept in the entire engine-load region including the SI region B where an air-fuel mixture is ignited by spark ignition. Thus, it becomes possible to control a combustion temperature of an air-fuel mixture at a low level to effectively reduce NOx emission from the combustion chamber 5.

Particularly, in cases where, in the first and second HCCI regions A1, A2, the effective compression ratio is set to a value (in the above embodiment, 15 to 18) higher than that in a conventional gasoline engine to perform compressed self-ignited combustion in the combustion chamber 5 increased in temperature/pressure as in the above embodiment, there is no need to perform internal EGR intended to allow a given amount of burned gas to be left in the combustion chamber 5, as measures, for example, to facilitate compressed self-ignited combustion. This provides an advantage of being able to prevent a specific heat ratio of an air-fuel mixture from being lowered so as to obtain a large fuel economy-improving effect.

Specifically, a theoretical efficiency η of an Otto cycle engine can be expressed as the following formula (1):

$$\eta = 1 - (1/\epsilon^{\kappa-1}), \qquad (1)$$

wherein ε is an effective compression ratio, and κ is a specific heat ratio of an air-fuel mixture.

Thus, given that the effective compression ratio ε is constant, it would be considered that, as a specific heat ratio κ of an air-fuel mixture becomes larger, the theoretical efficiency η becomes higher to provide more improved fuel economy.

The specific heat ratio κ becomes smaller along with an increase in the number of atoms constituting a gas molecule. For example, a specific heat ratio κ of a triatomic molecule, such as $CO_2$, is smaller than that of a diatomic molecule, such as $N_2$ or $O_2$. Thus, if a large amount of burned gas is left in the combustion chamber 5 by the internal EGR, a large number of triatomic molecules, such as $CO_2$, formed by combustion, will be contained in an air-fuel mixture in the combustion chamber 5, and thereby the specific heat ratio κ of the air-fuel mixture will become smaller. Thus, it is assumed that the theoretical efficiency η according to the formula (1) is reduced to cause deterioration in fuel economy. In contrast, in the above embodiment, there is no need to use the internal EGR for compressed self-ignited combustion. Thus, it can be expected to obtain a larger fuel economy-improving effect without causing the reduction in specific heat ratio κ as in the above case using the internal EGR.

In the above embodiment, the control of reducing the effective compression ratio from 18 to 15 in the second HCCI region A2 is achieved by increasing a retard amount of the closing timing of the intake valve 8 with respect to intake BDC. Thus provides an advantage of being able to adequately adjust an engine compression ratio with a relatively simple configuration for changing only the closing timing of the intake valve 8.

For example, it is contemplated to change a geometrical compression ratio of the engine by changing a stroke amount of the piston 2 (a position of compression TDC). In this case, there arises a need for providing a certain type of link mechanism or the like around the crankshaft 3 as a mechanism for variably changing the stroke amount of the piston 2, which causes a problem of structural complexity. In contrast, in the above embodiment, the retard amount of the closing timing of the intake valve 8 with respect to intake BDC is increased using the compression-ratio adjusting means made up of the VVT mechanism 42 and the valve-timing control section 51, to adjust the compression ratio. This provides an advantage of being able to adjust the compression ratio with a simpler configuration.

In the above embodiment, in order to reduce the increase rate of the combustion pressure in the second HCCI region A2, for example, fuel is injected at a plurality of timings based on control of the injector control section 52 (dp/dθ controller) to slow a combustion speed. This provides an advantage of being able to adequately reduce the increase rate of the combustion pressure by changing the fuel injection timing, to effectively prevent the occurrence of combustion noise.

In the above embodiment, the multi-hole injector 10 having a plurality of injection holes in a nozzle portion at a distal end thereof is provided in the engine body 1, and fuel having a high pressure of 100 MPa or more is injected from the injector 10 into the combustion chamber 5 through the plurality of injection holes. This provides an advantage of being able to more atomize fuel to effectively improve combustibility of an air-fuel mixture.

In the operation of injecting fuel in a plurality of stages in the second HCCI region A2, it is necessary to distributedly inject fuel within a significantly short period of time, particularly in the last injection. However, in the above structure where high-pressure fuel is injected from the multi-hole injector 10 to facilitate atomization, fuel is distributed and vaporized/atomized within a shorter period of time. This provides an advantage of reliably burn fuel injected in the split injection mode on a stage-by-stage basis to effectively improve controllability of combustion in the second HCCI region A2.

In the above embodiment, the ignition assist intended to allow the ignition plug 11 to assistively generate spark discharge is performed in the first HCCI region A1 set on a low engine-load side of the HCCI region A, to allow compressed self-ignition of an air-fuel mixture to be semi-forcedly induced under a condition that the excess air factor λ is in the range of 2 to 3, and the effective compression ratio is 18. Alternatively, the effective compression ratio may be further increased in the first HCCI region A1 to allow compressed self-ignition to be induced without the ignition assist.

It is believed that compressed self-ignition can be induced without the ignition assist, for example, by setting the geometrical compression ratio to about 20, and gradually reducing the effective compression ratio from 20 to about 18.

Further, in an engine operating region close to a no load condition where the air-fuel ratio is set to an extremely lean value corresponding to an excess air factor λ of about 3, there is possibility that compressed self-ignition is hardly induced even if the ignition assist is performed in the same manner as that in the above embodiment. Therefore, in such an engine operating region, after shifting the combustion mode to a stratified combustion mode to locally form an air-fuel mixture having a rich air-fuel ratio around the spark plug 11, the air-fuel mixture may be forcedly ignited by spark ignition.

In the above embodiment, the multi-spark ignition intended to allow the spark plug 11 to successively generate spark discharge plural times is performed in a part of the SI region B close to the maximum engine-load line to perform combustion by spark ignition under a lean air-fuel ratio corresponding to an excess air factor λ of 2. However, a technical point for achieving lean combustion in a high engine-load region is to increase energy of spark discharge of the ignition plug to be supplied to an air-fuel mixture, as much as possible. Thus, a specific means for achieve lean combustion in a high engine-load region is not limited to the multi-spark ignition.

Figure 14:
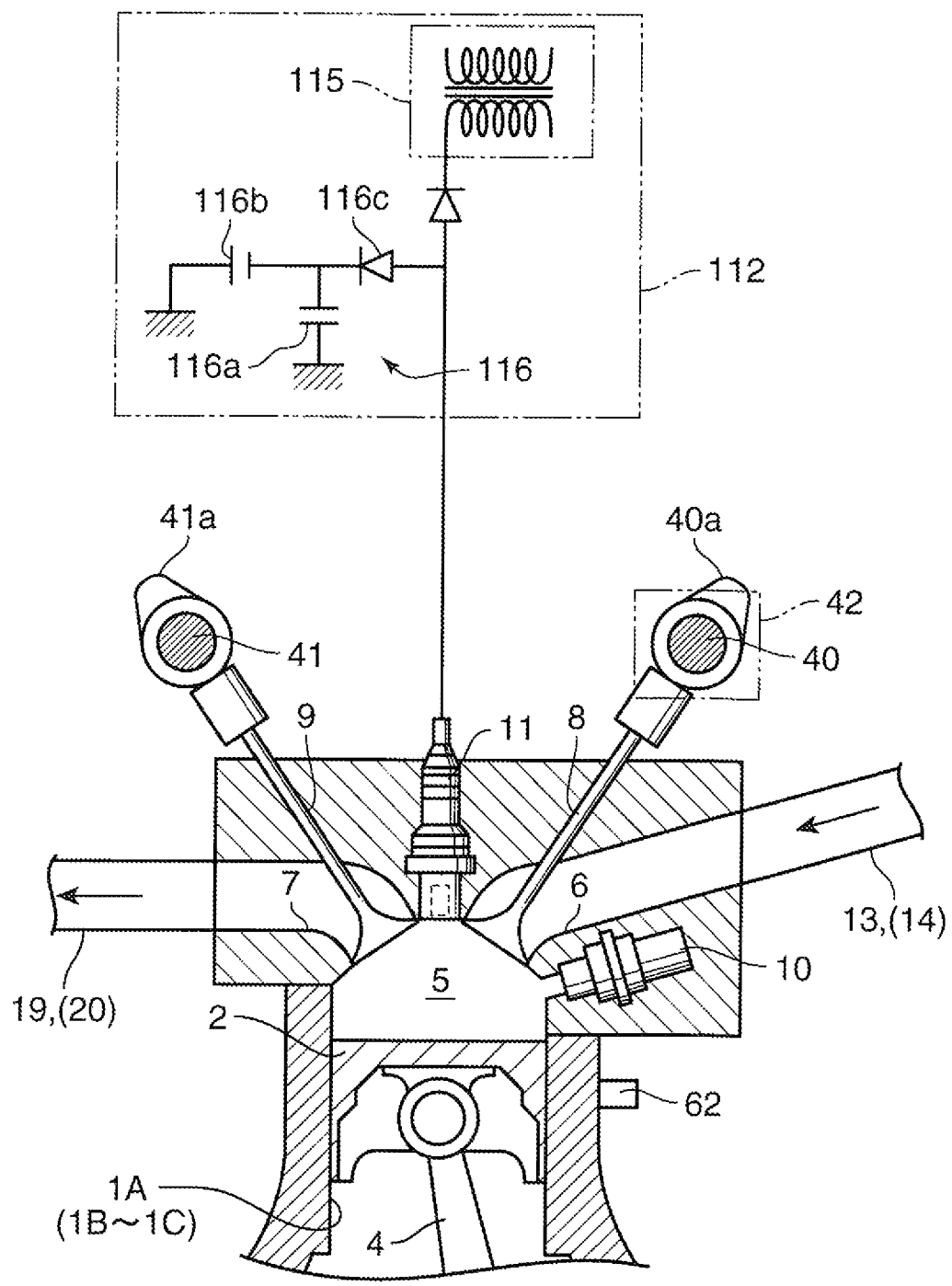
FIG. 14 is a schematic diagram showing a supercharged direct-injection engine according to another embodiment of the present invention.

For example, it is contemplated to employ plasma jet ignition which has already been put to practical use in airplane engines and others. FIG. 14 is a schematic diagram showing one example of a configuration for performing the plasma jet ignition using a spark plug 111 and an ignition circuit device 112.

The ignition circuit device 112 comprises an ignition coil 115 for supplying electric power for spark discharge, to the spark plug 111, and a plasma-generating plasma discharge circuit 116 connected to a secondary side of the ignition coil 115. The plasma discharge circuit 116 includes: a high-voltage power supply 116a comprising a step-up circuit and having a capability to generate a high voltage, e.g., about 600 V; a capacitor 116b for accumulating electric charges supplied from the high-voltage power supply 116a; and a diode 116c.

In an operation of performing plasma jet ignition according to electric-power supply from the ignition circuit device 112, a current is interrupted on a primary side of the ignition coil 115 in the same manner as that in conventional spark ignition, to generate a high voltage of several tens of thousands of volt, on the secondary side, and thus spark discharge is generate between electrodes of the spark plug 11. At the same time as the generation of the spark discharge, electric charges are released at a burst from the capacitor 116b of the plasma discharge circuit 116. Thus, extremely large discharge energy is instantaneously supply between the electrodes of the spark plug 11, and resulting plasma is jetted into the combustion chamber 5.

The plasma jetted into the combustion chamber 5 is high-energy radical species having extremely high activity and therefore excellent ignitability to an air-fuel mixture. It is believed that the plasma jet ignition can be used to reliably enhance ignitability to an air-fuel mixture in the SI region B.

In the above embodiment, the spark plug 11 is provided in a number of one for each of the cylinders 1A to 1D, as shown in FIGS. 1 and 2. Alternatively, with a view to enhancing the ignitability, a plurality of the spark plugs 11 may be provided for each of the cylinders. For example, instead of the arrangement in the embodiment illustrated in FIGS. 1 and 2 where the spark plug 11 and the injector 10 each provided in a number of one are arranged, respectively, on an upper side and a lateral side of the combustion chamber 5, both the spark plug 11 and the injector 10 may be arranged on the upper side of the combustion chamber 5 in adjacent relation, and a second spark plug may be additionally provided and arranged on the lateral side of the combustion chamber 5.

In the above embodiment, an electronically-controlled piezoelectric injector is provided as the injector 10. Alternatively, any other suitable type of injector capable of being ON/OFF switched with excellent response, such as a high-speed solenoid injector, may be used.

In the above embodiment, the retard amount of the closing timing of the intake valve 8 with respect to intake BDC is increased in the second HCCI region A2 and the SI region B to reduce the effective compression ratio to a value less than the geometrical compression ratio (in the above embodiment, 18) of the engine. However, a technical point for allowing the effective compression ratio to be reduced is to shift the closing timing of the intake valve 8 in a given amount with respect to intake BDC, wherein a direction of the shifting may be a retard side or may be an advance side. For example, even if the closing timing of the intake valve 8 is advanced in a reverse manner to that in the above embodiment, the intake air amount is reduced accordingly, so that the effective compression ratio can be reduced.

In the above embodiment, the excess air factor $\lambda$ as a ratio of an actual air-fuel ratio to a stoichiometric air-fuel ratio is gradually reduced from 3 to 2 along with an increase in engine load in the first HCCI region A1 including a low engine-load region, and then kept at 2 in the second HCCI region A2 and the SI region B on a high engine-load side relative to the first HCCI region A1. However, a technical point is to keep the excess air factor $\lambda$ at least in the range of 2 or more. Thus, a specific value of the excess air factor $\lambda$ in each of the engine operating regions (A1, A2, B) may be appropriately changed in the range of 2 or more.

In reality, an engine operation mode capable of keeping a lean air-fuel ratio corresponding to a excess air factor $\lambda$ of 2 or more is an engine warmed-up mode. Thus, in an engine warm-up mode having poor ignitability, the excess air factor $\lambda$ may be reduced to less than 2, i.e., the air-fuel ratio may be changed to a rich side, according to need. Further, even in the engine warmed-up mode, under a condition that a temperature of an exhaust gas-purifying catalyst (not shown) provided in the exhaust passage 19 does not reach an activation temperature, the air-fuel ratio may be temporarily changed to a rich side to increase an exhaust-gas temperature so as to activate the catalyst to maintain exhaust-gas purification performance.

In the above embodiment, the effective compression ratio in first HCCI region A1 is set to 18, and then gradually reduced from 18 to 15 in the second HCCI region A2. A specific value of the effective compression ratio in each of the engine operating regions may be appropriately changed as long as the specific value is a relatively high value enough to allow compressed self-ignited combustion to be produced.

In the above embodiment, an engine operation mode for a region on a high engine-speed side relative to a engine-speed region of the first and second HCCI regions A1, A2 (i.e., for a high engine-speed region) has not been mentioned. It would be considered that, in the high engine-speed region, combustion is hardly produced by the spark ignition under the same lean air-fuel ratio corresponding to an excess air factor $\lambda$ of 2 or more, as that in other engine-speed region. Thus, in the high engine-speed region, combustion may be produced by the spark ignition under an air-fuel ratio closed to the stoichiometric air-fuel ratio ($\lambda \approx 1$).

In the above embodiment, the electric motor 34 is provided in the small-capacity turbocharger 30 to assist in rotating the compressor 32 according to need. However, electric motor 34 may be omitted as long as the omission causes no particular problem in terms of supercharging performance.

Lastly, features and advantages of the present invention disclosed based on the above embodiment will be organized and described below.

According to a first aspect of the present invention, there is provided a supercharged direct-injection engine which comprises a supercharging device for compressing intake air, and an injector for directly injecting fuel into a combustion chamber. In the supercharged direct-injection engine, an excess air factor $\lambda$ as a ratio of an actual air-fuel ratio to a stoichiometric air-fuel ratio, at least in an engine warmed-up mode, is set to 2 or more in an entire engine-load region. Further, compressed self-ignited combustion is performed in a low engine-load region, and a supercharging amount by the supercharging device is increased along with an increase in engine load in a high engine-load region to allow the excess air factor $\lambda$ to be kept at 2 or more.

In the supercharged direct-injection engine of the present invention, a lean air-fuel ratio corresponding to an excess air factor $\lambda$ of 2 or more is kept in the entire engine-load region, and the compressed self-ignited combustion excellent in combustion efficiency is performed in a low engine-load region. This provides an advantage of being able to effectively reduce fuel consumption, and control a combustion temperature of an air-fuel mixture at a low level in the entire engine-load region to reduce NOx emission from the combustion chamber.

Preferably, in the supercharged direct-injection engine of the present invention, the excess air factor $\lambda$ is gradually changed to a richer side in the range of 2 or more, along with an increase in engine load in the low engine-load region, and a fuel injection amount of the injector and the supercharging amount by the supercharging device are increased in the high engine-load region to allow the excess air factor $\lambda$ to be kept at 2 or more.

This feature provides an advantage of being able to adequately ensure an engine output power suited to an engine load by control of the fuel injection amount and the supercharging amount, while keeping a lean air-fuel ratio corresponding to an excess air factor $\lambda$ of 2 or more in the entire engine-load region.

Preferably, in the supercharged direct-injection engine of the present invention, an engine operating region for performing the compressed self-ignited combustion is set in an engine-speed region except for at least a high engine-speed region, and spark-ignited combustion is performed in the high engine-speed region.

This feature provides an advantage of being able to guarantee a stable engine operation in the high engine-speed region by shifting the compressed self-ignited combustion to the spark ignited combustion in the high engine-speed region where the compressed self-ignited combustion is hardly produced.

According to a second aspect of the present invention, there is provided a supercharged direct-injection engine which comprises a supercharging device for compressing intake air, an injector for directly injecting fuel into a combustion chamber, a compression-ratio adjuster configured to variably set a compression ratio of the engine, and a $dp/d\theta$ controller configured to control an increase rate of an in-cylinder combustion pressure. In the supercharged direct-injection engine, an air-fuel ratio at least in an engine warmed-up mode is set to a value leaner than a stoichiometric air-fuel ratio in an entire engine-load region, and compressed self-ignited combustion is performed, in a first engine operating region including a low engine-load region, under a relatively high compression ratio, and, in a second engine operating region on a high engine-load side relative to the first engine operating region, under conditions that: the compression ratio is set to a value less than that in the first engine operating region by the compression-ratio adjuster; the increase rate of the in-cylinder combustion pressure is reduced by the $dp/d\theta$ controller; and a supercharging amount by the supercharging device is increased.

In the supercharged direct-injection engine according to the second aspect of the present invention, in the first engine operating region including a low engine-load region, the compression ratio is relatively increased to increase a temperature and a pressure in the combustion chamber so as to allow the compressed self-ignited combustion excellent in combustion efficiency to be performed under an air-fuel ratio leaner that the stoichiometric air-fuel ratio. Thus, it becomes possible to control a combustion temperature of an air-fuel mixture at a low level to reduce NOx emission from the combustion chamber, while effectively reducing fuel consumption. Further, in the second engine operating region on a high engine-load side relative to the first engine operating region, the compressed self-ignited combustion is performed under a lean air-fuel ratio to be achieved by increasing the supercharging amount. This provides an advantage of being able to adequately ensure an engine output power suited to an engine load, while reducing fuel consumption and NOx emission.

Further, when the compressed self-ignited combustion is performed in the second engine operating region, the compression ratio is reduced to a value less than that in the first engine operating region, and the increase rate in the combustion pressure is reduced. This provides an advantage of being able to reduce a maximum value of an in-cylinder temperature/pressure in proportion to the compression ratio, and prevent a rapid increase in combustion pressure so as to effectively prevent combustion noise (large noise similar to diesel knock) which would otherwise be caused by the rapid increase in combustion pressure.

Preferably, in the supercharged direct-injection engine according to the second aspect of the present invention, the compression-ratio adjuster is configured to change a closing timing of an intake valve to control the compression ratio. The compression-ratio adjuster is operable, during the operation of reducing the compression ratio in the second engine operating region, to increase a shift amount of the closing timing of the intake valve with respect to bottom dead center of an intake stroke.

This feature provides an advantage of being able to adequately adjust the compression ratio of the engine, with a relatively simple configuration for changing only the closing timing of the intake valve.

Preferably, in the supercharged direct-injection engine according to the second aspect of the present invention, the $dp/d\theta$ controller is configured to change a fuel injection timing of the injector to control the increase rate of the combustion pressure. The $dp/d\theta$ controller is operable, during the operation of reducing the increase rate of the combustion pressure in the second engine operating region, to change the fuel injection timing to a timing causing combustion of an air-fuel mixture to become slower.

This feature provides an advantage of being able to change the fuel injection timing to slow a combustion speed and adequately reduce the increase rate of the combustion pressure, to effectively prevent the occurrence of combustion noise.

Preferably, in the above supercharged direct-injection engine, the $dp/d\theta$ controller is operable, during the operation of reducing the increase rate of the combustion pressure in the second engine operating region, to divide the fuel injection timing into a plurality of timings.

According to this feature, fuel is injected in a plurality of stages to successively produce a plurality of compressed self-ignited combustions. The provides an advantage of being able to effectively prevent combustion noise which would otherwise occur due to a rapid increase in combustion pressure, while generating large combustion energy in total to ensure an adequate engine output power suited to an engine load.

This application is based on Japanese Patent Application No. 2009-085670, filed in Japan Patent Office on Mar. 31, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A supercharged direct-injection engine comprising:
   a gasoline engine,
   a supercharging device for compressing intake air,
   an injector for directly injecting fuel containing gasoline into a combustion chamber, and
   an ECU for controlling the injector and the supercharging device to adjust a fuel injection amount and a supercharging amount in such a manner that:
   an excess air factor $\lambda$ as a ratio of an actual air-fuel ratio to a stoichiometric air-fuel ratio, at least in an engine warmed-up mode, is set to 2 or more in an entire engine-load region;
   compressed self-ignited combustion is performed, in a low engine-load region, under a condition that the excess air factor $\lambda$ is gradually changed to a richer side in the range of 2 or more, along with an increase in engine load; and
   a fuel injection amount of the injector and a supercharging amount by the supercharging device are increased along with an increase in engine load in a high engine-load region to allow the excess air factor $\lambda$ to be kept at 2 or more.

2. The supercharged direct-injection engine as defined in claim 1, further comprising a spark plug for discharging an ignition spark in the combustion chamber, wherein the ECU controls the spark plug, the injector and the supercharging device in such a manner that:
   an engine operating region for performing the compressed self-ignited combustion is set in an engine-speed region except for at least a high engine-speed region; and
   spark-ignited combustion is performed in the high engine-speed region.

3. A supercharged direct-injection engine as defined in claim 1, further comprising a VVT mechanism for variably changing a closing timing of an intake valve, wherein:
   the ECU includes a valve-timing control section capable of changing the closing timing of the intake valve, by driving the VVT mechanism, to variably set a compression ratio of the engine, an injector control section capable of changing a fuel injection timing of the injector to control an increase rate of an in-cylinder combustion pressure, and a supercharging control section capable of adjusting the supercharging amount by the supercharging device;

the valve-timing, the injector control, and the supercharging control sections of the ECU control the VVT mechanism, the injector and the supercharging device in such a manner that, compressed self-ignited combustion is performed, in a first engine operating region including the low engine-load region, under a predetermined compression ratio, and, in a second engine operating region on a high engine-load side relative to the first engine operating region, under conditions that: the compression ratio is set to a value less than that in the first engine operating region; the increase rate of the in-cylinder combustion pressure is reduced; and the supercharging amount by the supercharging device is increased;

during the operation of reducing the compression ratio in the second engine operating region, the valve-timing control section controls the VVT mechanism to increase a shift amount of the closing timing of the intake valve with respect to bottom dead center of an intake stroke; and during the operation of reducing the increase rate of the combustion pressure in the second engine operating region, the injector control section controls the injector to divide the fuel injection timing into a plurality of timings.

* * * * *